United States Patent
Mine

(10) Patent No.: US 7,200,741 B1
(45) Date of Patent: Apr. 3, 2007

(54) MICROPROCESSOR HAVING MAIN PROCESSOR AND CO-PROCESSOR

(75) Inventor: Kazumasa Mine, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 300 days.

(21) Appl. No.: 09/716,378

(22) Filed: Nov. 21, 2000

(30) Foreign Application Priority Data

Nov. 22, 1999 (JP) .................................. 11-331960

(51) Int. Cl.
*G06F 9/44* (2006.01)
(52) U.S. Cl. ..................................................... 712/244
(58) Field of Classification Search ................ 712/244, 712/209, 30, 31, 34
See application file for complete search history.

(56) References Cited

U.S. PATENT DOCUMENTS

| | | | | |
|---|---|---|---|---|
| 4,219,873 A | * | 8/1980 | Kober et al. ................... | 712/31 |
| 4,695,945 A | * | 9/1987 | Irwin ........................... | 710/36 |
| 4,774,625 A | * | 9/1988 | Yamanaka .................... | 712/31 |
| 4,860,200 A | * | 8/1989 | Holmbo ....................... | 710/269 |
| 4,870,614 A | | 9/1989 | Quatse | |
| 5,109,514 A | * | 4/1992 | Garner et al. ................ | 710/260 |
| 5,715,439 A | * | 2/1998 | Schmidt et al. .............. | 712/229 |
| 5,727,227 A | * | 3/1998 | Schmidt et al. ............... | 712/36 |
| 5,768,613 A | | 6/1998 | Asghar | |
| 5,923,892 A | * | 7/1999 | Levy ............................ | 712/31 |

FOREIGN PATENT DOCUMENTS

| | | |
|---|---|---|
| JP | 62-232036 A | 10/1987 |
| JP | 02-311948 | 12/1990 |
| JP | 5-197551 A | 8/1993 |
| JP | 8-339325 | 12/1996 |
| JP | 11-85534 A | 3/1999 |

OTHER PUBLICATIONS www.dictionary.com search term: encode.*
European Search Report dated Jan. 15, 2002.
Melear, C. "Methods of Floating-Point Mathematics", 8079 Electro 1988 Conference Record, Los Angeles, California; vol. 13, May 10-12, 1988; pp. 48-301-9.
Japanese Office Action dated May 27, 2003, with partial English translation.

* cited by examiner

*Primary Examiner*—Eddie Chan
*Assistant Examiner*—Aimee J. Li
(74) *Attorney, Agent, or Firm*—McGinn IP Law Group, PLLC

(57) ABSTRACT

There is provided a microprocessor system that can execute a specific set of instructions at a high speed while limiting the increase in size of the circuitry. The microprocessor system, which executes instructions described in a program, comprises a main processor which executes a first set of instructions by means of hardware and executes a second set of instructions by means of software and a co-processor which operates under the control of the main processor to execute the second set of instructions by means of hardware. When the co-processor encounters a specific instructions of the second set for which data under the control of the main processor needs to be operated, the co-processor issues a notification of this fact to the main processor to request it to execute the specific instruction. In this case, the co-processor updates its stack pointer and program counter by itself by means of hardware.

35 Claims, 12 Drawing Sheets

FIG. 2A

<BEFORE OPERATION>

| | ADDRESS | CONTENT OF STACK MEMORY | |
|---|---|---|---|
| SP → | 0x1014 | DATA TO BE OPERATED | D5 |
| | 0x1010 | DATA TO BE OPERATED | D4 |
| | 0x100C | SUCCEEDING DATA | D3 |
| | 0x1008 | SUCCEEDING DATA | D2 |
| | 0x1004 | SUCCEEDING DATA | D1 |
| | ... | | |

FIG. 2B

<AFTER OPERATION>

| | ADDRESS | CONTENT OF STACK MEMORY | |
|---|---|---|---|
| | 0x1014 | | |
| SP → | 0x1010 | RESULTANT DATA | D6 |
| | 0x100C | SUCCEEDING DATA | D3 |
| | 0x1008 | SUCCEEDING DATA | D2 |
| | 0x1004 | SUCCEEDING DATA | D1 |
| | ... | | | ern
MICROPROCESSOR HAVING MAIN PROCESSOR AND CO-PROCESSOR

BACKGROUND OF THE INVENTION

1. Field of the Invention

This invention relates generally to microprocessors for executing instructions described in programs and more particularly to such a microprocessor system that is constituted comprising a main processor and a co-processor.

2. Description of the Related Art

There has conventionally been known a general-purpose microprocessor for executing various kinds of sets of instructions. Such general-purpose microprocessor is arranged to have, in addition to a processing function by means of hardware, an adaptive processing function by means of software. With such arrangement, the microprocessor can flexibly deal with various kinds of instruction sets with different architectures such as an instruction set for an interpreter language for realizing a virtual machine for Java and an instruction set for emulating another microprocessor.

There also exists a microprocessor system known in the art that comprises, as a main processor, a general-purpose microprocessor such as that described above and, as a co-processor, a microprocessor that operates under the control of the main processor. The co-processor in this kind of microprocessor system is provided for the purpose of accelerating a part of the processing by the main processor and comprises dedicated hardware, for example, for executing a special set of instructions used in the software of the main processor.

The above-described general-purpose microprocessor, however, has a problem that it requires a substantial processing time for the execution of instructions in a specific interpreter language, for example, for the virtual machine for Java although it can flexibly execute various kinds of sets of instructions. More specifically, since a general-purpose microprocessor has to flexibly deal with various kinds of instruction sets, it employs in general a general-purpose register and an accumulator in its hardware architecture. By virtue of such architecture, the microprocessor is suitable, from the view point of affinity to hardware, for example for the processing of C language having a language specification in which the presence of hardware resources such as registers has been taken into account. However, in the case of the Java language, for example, a source program is once converted into intermediate codes (so-called byte codes) for a virtual machine which are then translated and executed. Therefore, this kind of program language requires a treatment by means of software and thus needs a substantial time for its processing.

When building the above described microprocessor system comprised of a main processor and a co-processor, by arranging the hardware of the co-processor so as to exclusively process all the instructions contained in the instruction set for the specific program language such as the Java language, it may become possible to execute the specific set of instructions by means of the dedicated hardware. This may, however, leads to the increase in size of the circuitry of the co-processor with the result that its chip area increases as a whole, although the specific set of instructions can be executed at a high speed.

SUMMARY OF THE INVENTION

It is therefore an object of the present invention to provide a microprocessor system that can execute a specific set of instructions at a high speed while limiting the increase of its circuitry size.

A microprocessor system according to the present invention, which executes instructions described in a program, comprises a main processor (for example, the main processor 100 which will be described later) which executes by means of hardware those instructions which belong to a first instruction set (for example, instructions of a program contained in the program memory 300 which will be described later) and executes by means of software those instructions which belong to a second instruction set (for example, instructions of a program contained in the program memory 400 which will be described later) and a co-processor (for example, the co-processor 200 which will be described later) which operates under the control of the main processor to autonomously fetch an instruction belonging to the second instruction set to thereby execute same by means of its hardware.

With this structure, the instructions belonging to the second instruction set can be processed adaptively by the main processor or the co-processor. Therefore, by arranging such that the processing of those instructions belonging to the second instruction set is carried out as a rule by means of the hardware of the co-processor while only those of the instructions belonging to the second instruction set which are suitable for the execution by software are executed by the main processor as an exception, the size of the hardware is reduced as a whole with respect to the throughput required for the microprocessor system. It is thus achieved that the instructions belonging to a specific instruction set (the second instruction set) can be executed at a high speed while limiting the increase in size of the circuitry.

The co-processor may detect an encounter with a specific one of the instructions belonging to the second instruction set which the co-processor cannot process by itself and issue a notification of this encounter to the main processor to thereby request it to execute this instruction. For example, the co-processor detects an encounter with a specific one of the instructions belonging to the second instruction set for which data present under the control of the main processor (for example, data contained in the data memory 500 which will be described later) needs to be handled to thereby determine that the co-processor has encountered a specific instruction which it cannot process by itself.

With this structure, a specific instruction for which data under the control of the main processor needs to be handled, for example, is processed as the specific instruction which the co-processor cannot process by itself by the main processor according to the software executed thereby by handling the data which is under the control of the main processor. In other words, those instructions which are suitable for the processing by software or which the co-processor cannot process are processed by the main processor according to its software. By such arrangement, it can be achieved that the software of the main processor is used effectively and that the size of the hardware of the co-processor is maintained as small as possible, so that the size of the hardware as a whole can be limited effectively.

The co-processor may issue the notification by means of dedicated interrupt vectors (for example, the dedicated interrupt vectors specified by the dedicated interrupt request signals S290A to S290F which will be described later) assigned in advance respectively to a predetermined number of ones of the instructions belonging to the second instruction set which have a higher frequency of execution than the other instructions.

With this structure, when a given one of the instructions belonging to the second instruction set which has a higher frequency of execution is encountered, a notification to the main processor is performed by means, for example, of the dedicated interrupt request signal assigned to this instruction. The main processor can recognize, in addition to the notification from the co-processor, the instruction that the co-processor encountered based on the dedicated interrupt request signal. Therefore, the processing by the main processor for identifying the instruction that was requested by the co-processor to execute can be dispensed with.

Furthermore, each of the dedicated interrupt vectors may be assigned to a plurality of instructions belonging to the second instruction set.

With this structure, since two or more instructions are assigned to each of the dedicated interrupt vectors, the dedicated interrupt vectors can be assigned to much more kinds of instructions although the main processor may need, for example, a processing for identifying the instruction from the value in the program counter of the co-processor.

In addition, priorities may be set to a plurality of ones of the dedicated interrupt vectors. In this case, it may be conceived that a single instruction is assigned to a given one of the dedicated interrupt vectors to which a higher priority is set, while a plurality of instructions are assigned to a given one of the dedicated interrupt vectors to which a lower priority is set.

With this structure, a dedicated handler can quickly be specified for an instruction that has been assigned to a dedicated interrupt vector having a higher priority.

The co-processor may further comprise a stack memory for holding data generated in the course of execution of an instruction which belongs to the second instruction set (for example, the stack memory 270 which will be described later), a stack pointer for holding an address of the most recent data in the stack memory (for example, the stack pointer 260A which will be described later) and a hardware resource for carrying out a process for updating the stack pointer among processes which take place in the course of execution of the specific instruction (for example, the decoder 240A, the processing procedure control signal generation circuit 240B, the SP increase/decrease value generation circuit 240C and the adder 250A which will be described later).

With this structure, even for an instruction which is requested to process to the main processor, the process for updating the stack pointer among the processes which will take place in the course of execution of this instruction is carried out by the co-processor according to its hardware. The main processor thus can omit the process for updating the stack pointer during the processing of the requested instruction. As a result, the processing by the main processor according to its software can be simplified and the hardware of the co-processor is effectively used, so that the processing time by the software in the main processor can be shortened.

In addition, the co-processor may comprise a program counter for holding an address of an instruction which is currently processed and belongs to the second instruction set (for example, the program counter 260B which will be described later) and a hardware resource for carrying out a process for updating the program counter among processes which take place in the course of execution of the specific instruction (for example, decoder 240A, the processing procedure control signal generation circuit 240B, the PC increase/decrease value generation circuit 240D and the adder 250B which will be described later).

With this structure, even for an instruction which is requested to the main processor to process, the process for updating the program counter among the processes which will take place in the course of execution of this instruction is carried out by the co-processor according to its hardware. The main processor thus can omit the process for updating the program counter during the processing of the requested instruction. As a result, the processing by the main processor according to its software can be simplified and the hardware of the co-processor is effectively used, so that the processing time by the software in the main processor can be shortened.

Furthermore, the co-processor may comprise a status register for holding information indicative of a need of the notification, while the main processor may periodically access the status register to recognize, from the content of the status register, that the co-processor has encountered the specific instruction to thereby execute the specific instruction.

With this structure, since the main processor can recognize that the co-processor has encountered a specific instruction by periodically accessing the status register, it will not be necessary to carry out the interrupt processing by the use of the interrupt request signals (the interrupt vectors) to the main processor. The notification from the co-processor to the main processor can thus be simplified.

The main processor may further comprise an interrupt request reception circuit for encoding the dedicated interrupt vectors from the co-processor to specify an interrupt handler which corresponds to the specific instruction to be processed (for example, the interrupt request reception circuit 190 which will be described later).

With this structure, an interrupt handler is specified directly by the main processor based on the dedicated interrupt vectors fed from the co-processor. As a result, the main processor can omit the software processing for specifying an interrupt handler to be started, so that the processing time in the main processor can be shortened.

The co-processor may further comprise an instruction queue for holding a fetched instruction which belongs to the second instruction set (for example, the instruction queue 230 which will be described later), while the main processor may refer to the instruction queue of the co-processor to specify an interrupt handler which corresponds to the specific instruction to be executed.

With this structure, the main processor can recognize the instruction which the co-processor has encountered by reference to the instruction queue and can specify an interrupt handler therefrom. As a result, the software processing for specifying an interrupt handler to be started in the main processor can be simplified, so that the processing time in the main processor can be shortened.

Furthermore, the co-processor may have stack architecture (for example, the elements corresponding to the architecture which the co-processor 200, 200A, 200B employs, which will be described later).

With this structure, the processing of those instructions that involve the frequent use of subroutines and the addressing of zero operands can be carried out efficiently in the co-processor. Therefore, instructions of an interpreter language of the stack architecture such as Java can be executed efficiently.

The co-processor employing a stack architecture may comprise a stack-top register for holding a predetermined number of data from the top of stack data (for example, the stack-top register 270A which will be described later), while a stack memory (270B) may be provided outside the co-processor.

With this structure, instructions of such a program language which has a high frequency of accesses to the predetermined number of top data among the stack data can be executed efficiently, while the capacity of the stack memory can be increased adaptively.

The co-processor may further comprise a cache memory provided between the stack memory and the stack-top register for caching a part of data held in the stack memory (for example, the cache memory 270C that will be described later).

With this structure, the stack memory can be accessed at a high speed since it is accessed through the cache memory. Consequently, even if the stack memory is of the type that cannot be accessed at a high speed, an apparent speed of the processing can be increased.

Furthermore, the co-processor may detect a predetermined instruction for which stack data needs to be manipulated over the stack-top register and the stack memory, whereupon the co-processor may move contents of the stack-top register to the stack memory and thereafter request the main processor to execute the predetermined instruction, while the main processor may refer to contents of the stack memory, to which the contents of the stack-top register have been moved, to thereby execute the predetermined instruction.

With this structure, when a process for changing a stack frame must be carried out, only the stack memory needs to be referred to, so that the load on this process can be decreased.

Furthermore, a plurality of co-processors (for example, the co-processors 200X to 200Z that will be described later) may be provided in correspondence with a plurality of processes described in a program.

With this structure, a plurality of processes in a program can be performed in parallel, so that the speed of the processing can be increased.

The microprocessor system may further comprise a program memory in which instructions belonging to the second instruction set are contained (for example, the program memory 400 which will be described later), while the co-processor may further comprise a program counter for holding an address of an instruction which is currently processed and belongs to the second instruction set (for example, the program counter 260B which will be described later), an instruction queue for holding instructions which belong to the second instruction set (for example, the instruction queue 230 which will be described later) and an instruction fetch circuit for fetching an instruction belonging to the second instruction set from the program memory using the value contained in the program counter as its address and for setting the fetched instruction to the instruction queue (for example, the instruction fetch circuit 220 which will be described later).

With this structure, the co-processor can autonomously fetch an instruction and execute it, and can thus execute instructions belonging to the second instruction set by means of hardware. By doing so, it will not be necessary for the main processor to perform the operation of fetching an instruction belonging to the second instruction set from the program memory as data and setting the instruction to the instruction queue of the co-processor. Thus, the load on the main processor can be decreased with the decease in time of the fetching operation, so that an increase in speed of the execution of the second instruction can be achieved with the result that the processing performance of the system as a whole is improved.

BRIEF DESCRIPTION OF THE DRAWINGS

FIGS. 2A and 2B are illustrations which explain the concept of operation of the stack memory in the first embodiment of the invention;

DETAILED DESCRIPTION OF THE PREFERRED EMBODIMENTS

Embodiments of the present invention will now be described with reference to the accompanying drawings.

First Embodiment

Figure 1:
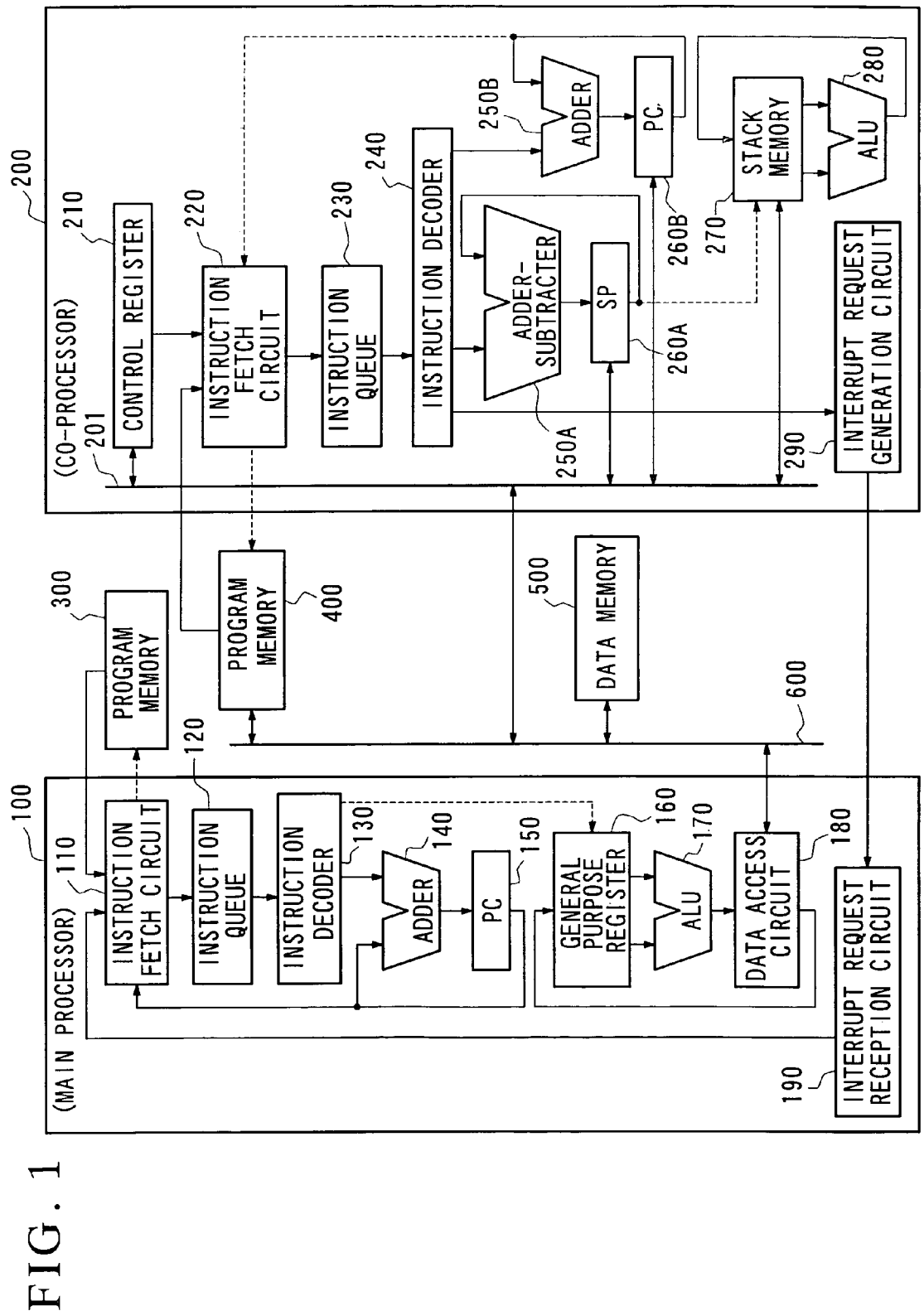
FIG. 1 is a block diagram showing the structure of a microprocessor system provided in accordance with a first embodiment of the invention.

FIG. 1 shows the structure of a microprocessor system provided in accordance with a first embodiment of the invention. This microprocessor system is constructed so as to be able to execute a plurality of kinds of sets of instructions described in different program languages and comprises, as its principal constituent elements, a general purpose microprocessor 100 in which a general-purpose register architecture has been employed and a co-processor 200 in which a stack architecture has been employed.

The main processor 100 executes by means of hardware a first set of instructions for realizing program languages such as C language and an assembler and also executes by means of software a second set of instructions for realizing specific languages such as the Java language. The co-processor 200 operates under the control of the main processor 100 in concert therewith and executes by means of hardware the second set of instructions, for example, for the Java language, which are different from the first set of instructions.

A program memory 300 is provided to store a program for controlling a sequence of operations of the main processor 100, i.e., a machine language corresponding to the first instruction set. On the other hand, a program memory 400 is provided to store as the second instruction set intermediate codes, for example, for a Java virtual machine. A data memory 500 is provided for storing data to be handled by the main processor 100 such as arithmetic data to be input to the main processor 100 and the results of such arithmetic operations.

It is assumed that a machine language obtained by compiling a program written in C language, i.e., a machine language describing the operation procedure of the main processor has been laid in the program memory 300 in this embodiment. It is also assumed that intermediate codes, for example, for the Java language have been laid in the program memory 400.

The program memory 300 is directly connected to the main processor 100. The program memory 400 and the data memory 500 are connected, through an external bus 600 (a data bus disposed externally of the main processor 100 and the co-processor 200), to each other and to the main processor 100. The main processor 100, the co-processor 200, the program memories 300 and 400, the data memory 500 and the external bus 600 are mounted on the same print circuit board to constitute the microprocessor system. Alternatively, some or all of these elements can be integrated in a single system LSI (Large Scale Integration).

The main processor 100 has the following structure to form a circuitry for decoding the second set of instructions to thereby control the progress of a program. The main processor 100 comprises an instruction fetch circuit 110 for accessing the program memory 300 to fetch therefrom an instruction belonging to the first instruction set (hereinafter referred to simply as "first instruction"), an instruction queue 120 for temporarily holding the first instruction thus fetched, an instruction decoder 130 for decoding the first instruction, an adder 140 for updating the address of the instruction currently processed by the main processor 100 (i.e., the value in a program counter which will hereinafter be referred to as "PC value") and the program counter 150 for holding the PC value.

The main processor 100 further has the following structure to form a circuitry for carrying out an operation in accordance with the result of the decoding by the instruction decoder 130. The main processor 100 comprises a general purpose register 160 for temporarily holding input data to be used in an arithmetic operation, the results of such operation (output data) and the like; an arithmetic logic unit 170 for performing an arithmetic operation on the input data (hereinafter referred to as "ALU"); a data access circuit 180 for causing data to be loaded or stored between the general purpose register 160 and the external bus 600 using an address as produced by the ALU 170; and an interrupt request reception circuit 190 for receiving an interrupt request fed from the co-processor 200 which will be described later.

This general-purpose main processor 100 is arranged such that it can indirectly execute the second set of instructions by means of software by executing the first set of instructions by hardware.

When the co-processor 200 encounters any of those specific ones of the second set of instructions for which the co-processor 200 has to process data which is under the control of the main processor 100, the co-processor 200 informs the main processor 100 that it requests the main processor to execute this instruction. More specifically, the co-processor 200 has the following structure to form a circuitry for decoding the second set of instructions contained in a program to thereby control the progress of the program. The co-processor 200 comprises a control register 210 for temporarily holding control data for controlling its own specific basic operations (for example, data for commanding the start of operation or the stop of operation), an instruction fetch circuit 220 for fetching from the program memory 400 an instruction belonging to the second instruction set (hereinafter referred to simply as "second instruction") in accordance with the control data held in the control register 210, an instruction queue 230 for temporarily holding the second instruction thus fetched, an instruction decoder 240 for decoding the fetched second instruction, an adder-subtracter 250A for updating the top address of stacked data (i.e., the value in a stack pointer, which will hereinafter be referred to as "SP value") under the command of the instruction decoder, the stack pointer 260A for holding the SP value, an adder 250B for updating an address of the currently processed instruction (i.e., a program count value, which will hereinafter be referred to as "PC value") under the command of the instruction decoder 240 and a program counter 260B for holding the PC value.

The wording "top address of the stacked data" or "SP value" in this invention should be understood to mean an address of the most recent data stacked.

The co-processor 200 further has the following structure to form a circuitry for carrying out an operation in accordance with the results of decoding by the instruction decoder 240. The co-processor 200 comprises a stack memory 270 for retaining various data (arithmetic operands, local variables, procedural operands and so on of the second instruction) generated in the course of executing the second instruction, an ALU 280 for performing an arithmetic operation on the operand in the stack memory 270 and an interrupt request generation circuit 290 for generating an interrupt request to the main processor 100 in accordance with the result of decoding by the instruction decoder 240. The stack built in the stack memory 270 grows from the lower address side to the higher address side, and the width of each stack data contained in the stack is selected to be thirty-two bits (four bytes) for example.

The control register 210, the stack pointer 260A, the program counter 260B, and the stack memory 270 are connected to the external bus 600 through an internal bus 201 of the co-processor 200. Thus, it is so arranged that the contents of the control register 210 and the stack pointer 260A in the co-processor 200 can be set directly by the main processor 100.

The description of the operation of the stack memory 270 will now be supplemented with reference to FIGS. 2A and 2B. The stack memory 270 is a memory of the LIFO (Last In First Out) type and temporarily retains data during the execution of a program by stacking them one upon the other. The example of FIGS. 2A and 2B shows how the contents of the stack memory are changed when a binomial operation is performed on two pieces of data contained respectively in the top address indicated by the stack pointer and its preceding address (an address obtained by subtracting four).

Before the operation, data D1 to D5 are sequentially loaded in addresses "0x1004" to "0x1014" in a stacked manner ("0x" signifies a hexadecimal number) as shown in FIG. 2A. In this case, the address "0x1014" of the last loaded data D5 is the stack top address and corresponds to the value in the stack pointer. When the execution of a binomial operation (an addition of two terms, for example) is started in this condition, the operation is performed with the data D5 in the address "0x1014" indicated by the stack pointer and the data D4 in the address "0x010".

More specifically, if the above operation is an addition, the data D4 and the data D5 are added together to form an operation result. At this moment, the data D4 and D5 will not be necessary any longer. Therefore, as shown in FIG. 2B, the data D6 thus calculated as the operation result is stored in the address "0x010" next to the address of the following data D3 and the value in the stack pointer is updated to indicate the address "0x010". In this manner, the stack memory temporarily stores data in the course of processing an operation and the stack pointer indicates the top address of the data effective at that time.

Figure 3:
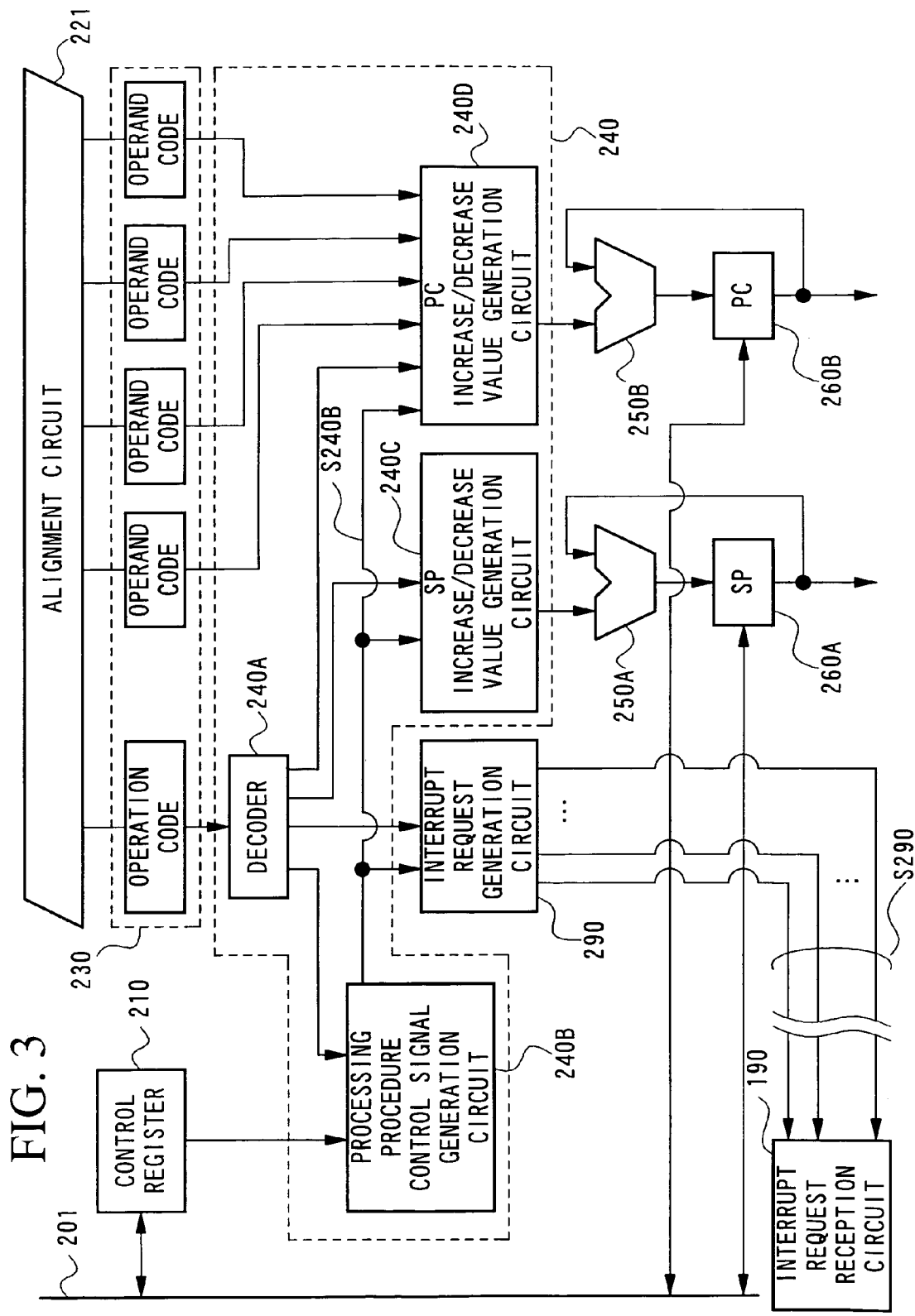
FIG. 3 is a block diagram showing the detail of the instruction decoder and the structure of its peripheral circuits in the first embodiment of the invention.

FIG. 3 shows the detailed structure of the instruction decoder 240 together with its peripheral circuits. An alignment circuit 221 is constructed as a part of the function of the instruction fetch circuit 220 and serves to extract an operation code and operands from the fetched second instruction and to output them to the instruction queue 230 after aligning them.

The instruction decoder 240 is constituted comprising a decoder 240A for decoding the operation code held in the instruction queue 230, a processing procedure control signal generation circuit 240B for generating a processing procedure control signal S240B in accordance with the decoding result of the operation code, an SP increase/decrease value generation circuit 240C for generating an increase/decrease value for the SP value and a PC increase/decrease value generation circuit 240D for generating an increase/decrease value for the PC value.

Figure 4:
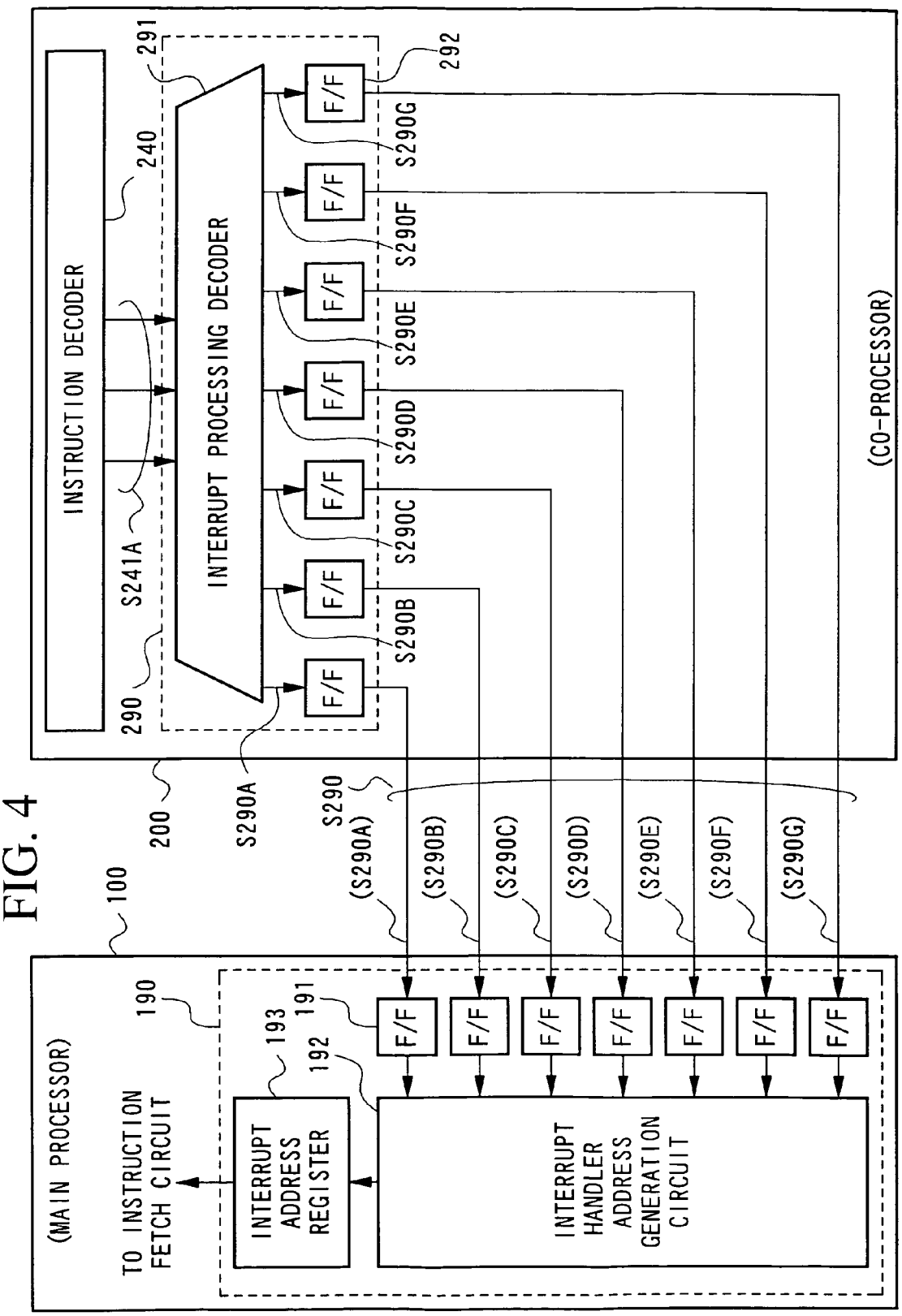
FIG. 4 is a block diagram showing the detailed structure of the interrupt request generation circuit and the interrupt request reception circuit in the first embodiment of the invention.

FIG. 4 shows in more detail the interrupt request reception circuit 190 in the main processor 100 and the interrupt request generation circuit 290 in the co-processor 200.

The interrupt request generation circuit 290 is comprised of an interrupt processing decoder 291 and a plurality of flip-flops (F/F) 292. The interrupt processing decoder 291 outputs an interrupt vector S290 composed of a plurality of dedicated interrupt request signals S290A to S290F and a common interrupt request signal S290G in accordance with an interrupt request signal S241A from the instruction decoder 240. In the following description, the plurality of dedicated interrupts request signals S290A to S290F will be referred to as "dedicated interrupt vector" according to circumstances.

The dedicated interrupt request signals S290A to S290F have been assigned in advance to a specific one or ones of the second set of instructions which the co-processor cannot process by itself and which have a relatively high frequency of execution. That is to say, when the co-processor encounters any of these specific instructions, that dedicated interrupt request signal that has been assigned to this encountered instruction is activated. Thus, the main processor can recognize the encountered instruction directly from the activated dedicated interrupt request signal. The common interrupt request signal S290G has been assigned in common to those instructions, other than the above-described specific instructions, which the co-processor cannot process by itself.

The co-processor 200 is thus arranged so as to issue a "notification" by means of the one or the plurality of dedicated interrupt request signals assigned in advance to the one or the plurality of instructions of the second set of instructions having a high frequency of execution.

In this first embodiment, the determination of whether the co-processor 200 can process an instruction by itself is made based on whether it becomes necessary in the course of processing (or executing) the instruction to operate the data which is under the control of the main processor 100 (for example, the data contained in the data memory 500). That is to say, the co-processor 200 determines in such a manner that those instruction for which data under the control of the main processor 100 must be operated cannot be processed by itself and that other instructions can be processed by itself. The specific instructions which the co-processor 200 cannot process by itself have been defined in advance in the instruction decoder 240.

The dedicated interrupt request signals S290A to S290F and the common interrupt request signal S290G are held in the flip-flops 292 and then outputted as the interrupt vector S290 to the main processor 100. In the example shown in FIG. 4, the second instruction is identified by a logical combination of the three kinds of interrupt request signals S241A fed from the instruction decoder 240, and one of the dedicated interrupt request signals S290A to S290F and the common interrupt request signal S290G is selectively activated in accordance with the content of the instruction thus identified.

The dedicated interrupt request signals S290A to S290F may be given priorities. In this case, for example, a single instruction may be assigned to an interrupt request signal of a higher priority while a plurality of instructions may be assigned to an interrupt request signal of a lower priority. With such arrangement, a dedicated handler can immediately be specified for an instruction to which an interrupt request signal of a higher priority has been assigned. For an instruction to which an interrupt request signal of a lower priority has been assigned, after a process for identifying the actually fetched instruction is carried out by a handler which is shared by a plurality of instructions assigned to this interrupt request signal, a routine for processing the interrupt by this instruction is specified.

The interrupt request reception circuit 190 in the main processor 100 is comprised of a plurality of flip-flops 191, an interrupt handler address generation circuit 192 and an interrupt address register 193. The dedicated interrupt request signals S290A to S290F and the common interrupt request signal S290G sent from the co-processor are held respectively by the plurality of flip-flops 191. The interrupt handler address generation circuit 192 encodes the dedicated interrupt request signals S290A to S290F from the co-processor 200 to generate the address of an interrupt handler. This address of the interrupt handler is held in the interrupt address register 193 and then outputted to the above-described instruction fetch circuit 110.

The interrupt request reception circuit 190 is thus arranged to encode the dedicated interrupt request signals (dedicated interrupt vectors) from the co-processor 200 to specify an interrupt handler which corresponds to the specific instruction to be processed.

The main processor 100 performs various kinds of operations with respect to the co-processor 200 to control the operation thereof. These operations are performed by means of software by executing programs stored in the program memory 300 with the main processor 100.

Figure 5:
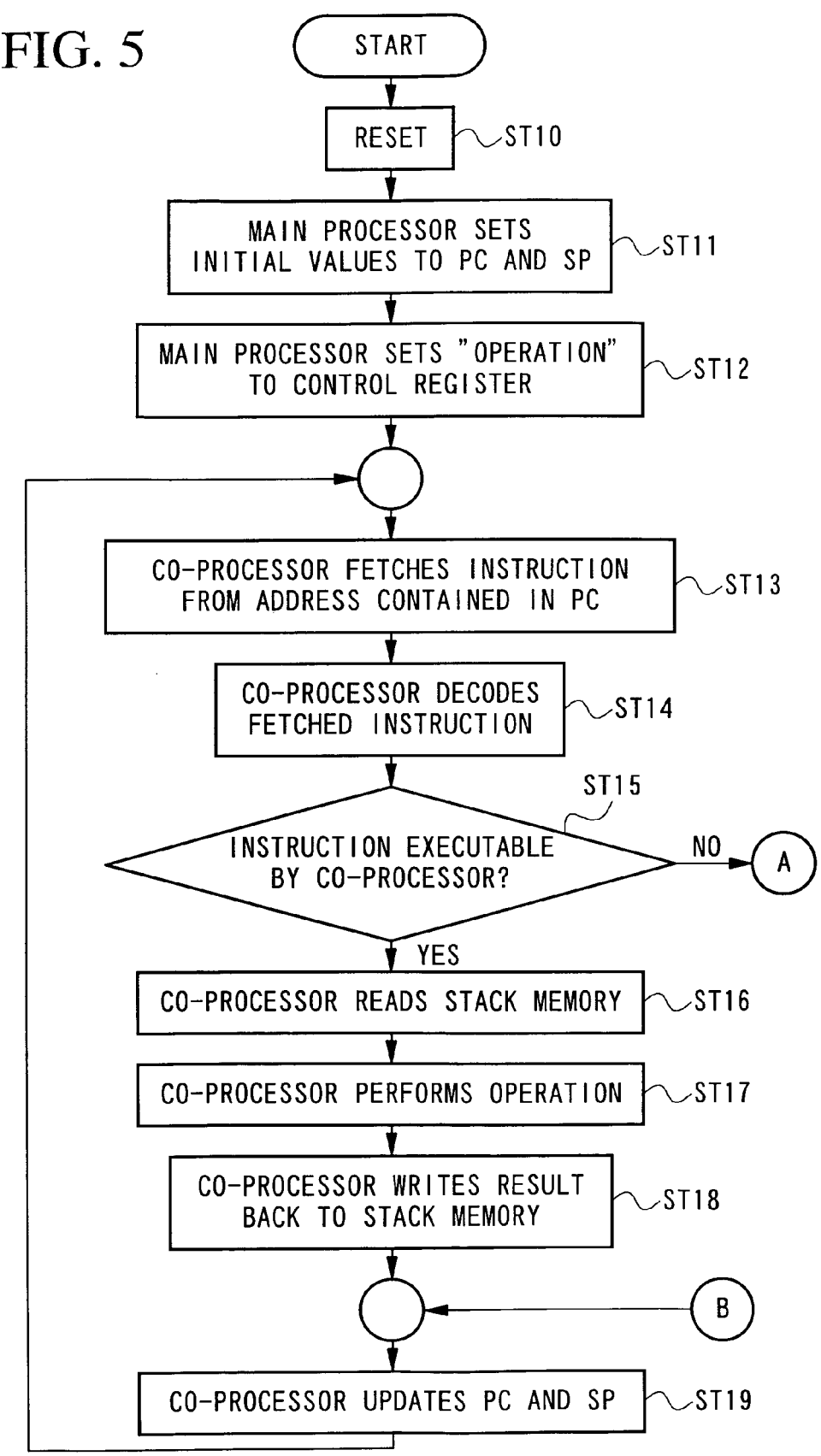
FIG. 5 is a flow chart showing the operation of the microprocessor system according to the first embodiment of the invention when the instruction can be processed in the co-processor.
Figure 6:
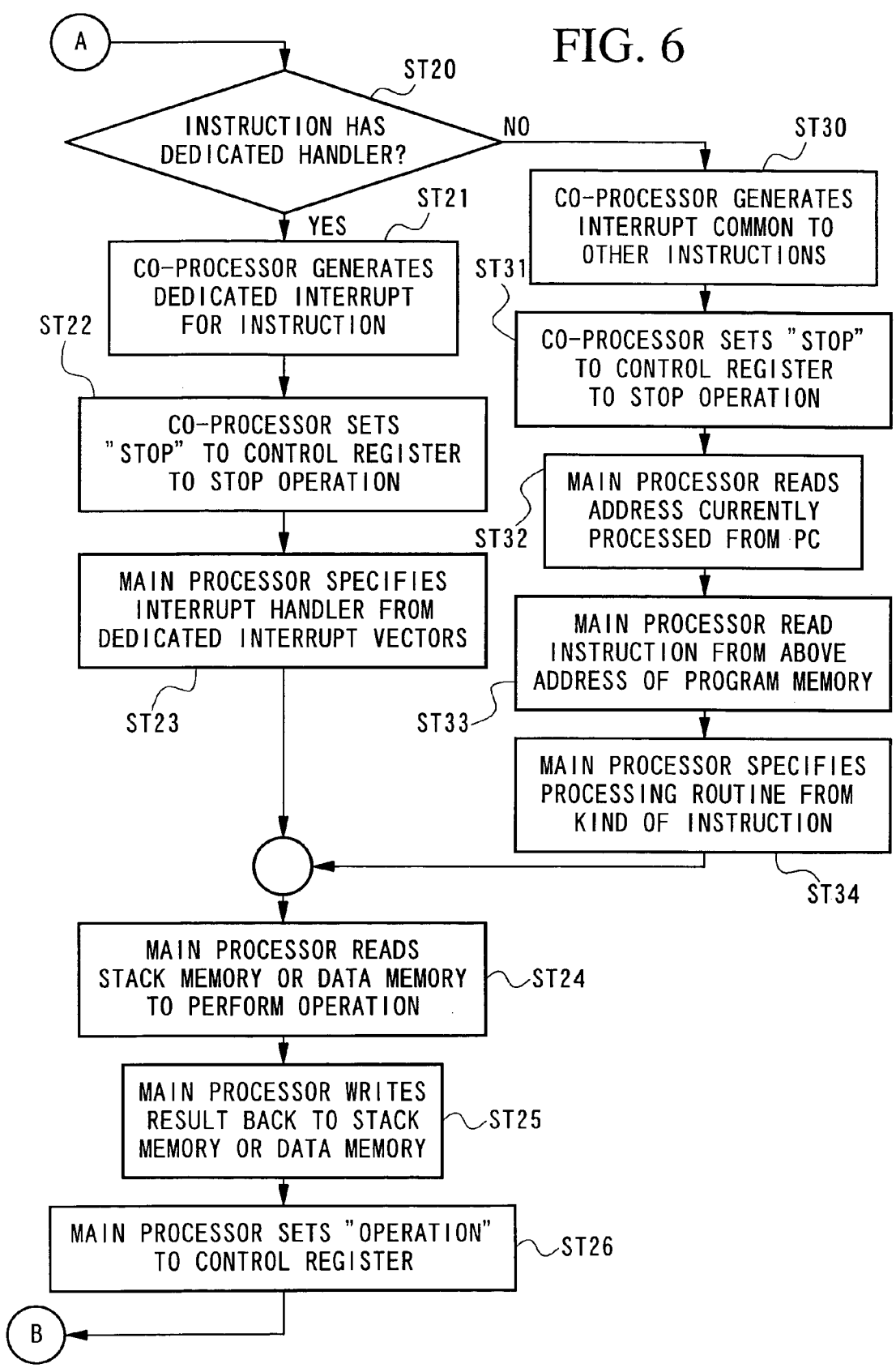
FIG. 6 is a flow chart showing the operation of the microprocessor system according to the first embodiment of the invention when the instruction cannot be processed in the co-processor.

The operation of the microprocessor system according to this first embodiment will now be described with reference to the flowcharts shown in FIGS. 5 and 6 for an exemplary case where a program described with stack architecture instructions such as those in the Java language is executed.

Step ST10: First, this microprocessor system is reset whereby the operations of various portions thereof are initialized. After this reset operation, the main processor 100 starts operating while the co-processor 200 is brought into a stop state.

Step ST11: Subsequently, the main processor 100 sets the top address of the stack to the stack pointer 260A in the co-processor 200 and also sets the top address of the program to be executed by the co-processor 200 to the program counter 260B by its operation according to software. Thus, initial values are set to the stack pointer 260A and the program counter 260B of the co-processor 200, respectively.

Step ST12: Subsequently, the main processor 100 sets, by its operation according to software, the control data for commanding "start of operation" (data "0" for example) to the control register 210 in the co-processor 200 to thereby cause the co-processor 200 to start operation.

Step ST13: Then, the co-processor 200 which has thus started operation refers to the address set in the program counter 260B (the PC value) to access the program memory 400, in which the intermediate codes of the second instruction set have been laid, by its operation according to hardware, whereupon a second instruction is autonomously fetched from the above address by the instruction fetch circuit 220. The instruction thus fetched is temporarily held in the instruction queue 230.

Step ST14: The co-processor 200 then decodes the fetched second instruction in the instruction decoder 240.

Step ST15: The co-processor 200 then determines whether the fetched second instruction can be processed by the co-processor itself.

If the second instruction, which the co-processor 200 thus encountered, is an instruction for which it is not necessary to operate any data under the control of the main processor such as "iadd" for a Java virtual machine (an instruction to add integer number data together), i.e., an instruction which the co-processor 200 can process (which corresponds to "YES" at step ST15), the co-processor 200 executes the following steps ST16 to ST19 in order to process this instruction.

Step ST16: The co-processor 200 reads the data to be processed in the arithmetic operation from the stack memory 270 by its operation according to hardware. In the case of the above-described "iadd" instruction, the data to be processed in the arithmetic operation are read from the address indicated by the SP value and the address obtained by subtracting four from the address indicated by the SP value (i.e., "SP value—4").

Step ST17: Subsequently, the co-processor 200 performs the arithmetic operation on the data read from the stack memory 270 by its operation according to hardware. More specifically, the co-processor 200 adds the data read from the address indicated by the SP value and the data read from the address indicated by the "SP value—4" together in the case of the above "iadd" instruction.

Step ST18: The co-processor 200 then writes the result of the arithmetic operation back to the stack memory 270 by its operation according to hardware. In the case of the above "iadd" instruction, the result of the arithmetic operation is written back to the address obtained by subtracting four from the address indicated by the SP value (i.e., the address "SP value—4").

Step ST19: The co-processor 200 then updates, by its operation according to hardware, the SP value in the stack pointer 260A and the PC value in the program counter 260B in accordance with the kind of the instruction currently processed.

More specifically, the SP increase/decrease value generation circuit 240C calculates an increase/decrease value for the current SP value in accordance with the result of decoding by the decoder 240A in the instruction decoder 240. The adder-subtracter 250A adds the calculated increase/decrease value to the current SP value to update the SP value and sets this updated SP value to the stack pointer 260A. On the other hand, the PC increase/decrease value generation circuit 240D calculates an increase/decrease value for the current PC value in accordance with the result of decoding by the decoder 240A in the instruction decoder 240. The adder 250B adds the calculated increase/decrease value to the current PC value to update the PC value and sets this updated PC value to the program counter 260B.

In the case of the above-described "iadd" instruction, the PC and SP values are updated by adding "1" to the current PC value in the program counter 260B and by subtracting "4" from the current SP value in the stack pointer 260A.

Thereafter, the processing returns to the step ST13 to fetch the next second instruction and another processing is carried out in accordance with the content of this instruction in a manner similar to the above.

Description will now be made on the processing where the fetched second instruction cannot be processed by the co-processor 200.

When the second instruction, which the co-processor 200 encounters, is an instruction of such kind that data under the control of the main processor 100 must be operated, i.e., an instruction which the co-processor 200 cannot process by itself, such as an "iaload" instruction for a Java virtual machine (an instruction for loading data from an array of integers), the co-processor 200 makes a negative determination at the step ST15 ("NO" at step ST15). In this case, each of the following steps ST20 to ST26 is executed by the main processor 100 or the co-processor 200 in order to process this instruction.

Step ST20: The co-processor 200 determines whether the present instruction has its own dedicated handler or not, that is to say, whether a dedicated interrupt request signal has been assigned to this instruction to specify a handler for processing its interrupt (an interrupt handler). In this embodiment, it is assumed that the dedicated interrupt request signal S290A has been assigned to the "iaload" instruction and that the "iaload" instruction has its own dedicated handler.

Step ST21: In this case ("YES" at step ST20), the co-processor 200 causes an interrupt to occur by the dedicated interrupt request signal S290A assigned to the present instruction to thereby notify the main processor 100 that the co-processor has encountered the "iaload" instruction which it cannot process by itself.

Step ST22: The co-processor 200 then sets control data for commanding a "stop of operation" (data "1" for example) to the control register 210 by its operation according to hardware and temporarily stops its operation.

Step ST23: Then, the main processor 100 which has received the notification from the co-processor 200 by the dedicated interrupt request signal S290A specifies an interrupt handler corresponding to the instruction to be processed. More specifically, the main processor encodes the interrupt request signal S290 (S290A to S290G) from the co-processor 200 in the interrupt handler address generation circuit 192 to thereby generate the address (interrupt address) of the interrupt handler.

Step ST24: Once the instruction has thus been identified, the main processor 100 reads, by its operation according to software, data necessary for the execution of the instruction (i.e., for an arithmetic operation) from the stack memory 270 or the data memory 500 and carries out the arithmetic operation in accordance with the content of the instruction. In the case of the above-described instruction "iaload" for example, the main processor 100 reads the data (an index to an array) specified by the address indicated by the SP value and the data (a reference to the array) specified by the address obtained by subtracting four from the address indicated by the SP value (i.e., "SP value—4") from the stack memory 270. The main processor 100 then reads that data from the data memory 500 contained in the array indicated by the read array reference that corresponds to the index.

Step ST25: Subsequently, the main processor 100 writes the result of the operation back to the stack memory 270 in the co-processor 200 or to the data memory 500 by its operation according to software. In the case of the above "iaload" instruction, the main processor 100 designates the address obtained by subtracting four from the SP value (i.e., "SP value–4") and then writes the above data read from the data memory 500 in the stack memory 270.

Step ST26: Subsequently, the main processor 100 sets, by its operation according to software, control data for commanding "start of operation" (data "0" for example) to the control register 210 in the co-processor 200 to thereby cause the co-processor 200 to start operation again.

Thereafter, the processing returns to the above-described step ST19 to update the PC and SP values. Then, the processing returns to the step ST13 to fetch the next instruction for which an operation similar to the above-described operation will be carried out.

Next, description will be made on the processing where the fetched instruction has no dedicated handler. In this situation, the co-processor 200 takes a negative determination at the above-described step ST20 ("NO" at step ST20). In this case, a notification will be made by means of the common interrupt request signal S290G, but it will not be possible to identify in a univocal manner the kind of the instruction from this interrupt request signal S290G which is common to a plurality of instructions. Therefore, the main processor 100 and the co-processor 200 execute the following steps ST30 to ST34 and ST24 to ST26 to identify the instruction and process the identified instruction.

Step ST30: The co-processor 200 activates the common interrupt request signal S290G and sends it to the main processor 100, by its operation according to hardware.

Step ST31: Subsequently, the co-processor 200 sets, by its operation according to hardware, control data for commanding a "stop of operation" (data "1" for example) to the control register 210 to thereby stop the operation of the co-processor.

Step ST32: Then, the main processor 100, which has received the notification from the co-processor 200 by the common interrupt request signal S290G, specifies a common interrupt handler to perform an interrupt processing. More specifically, the main processor 100 reads, by its operation according to software, the PC value from the program counter 260B to obtain the address of the instruction currently processed.

Step ST33: Subsequently, the main processor 100 designates the address of the program memory 400 as obtained from the PC value to read therefrom the instruction code to thereby identify the kind of the instruction currently processed from this code.

Step ST34: Then, the main processor 100 designates, from the kind of the identified instruction, that processing routine of the common interrupt handler that corresponds to this instruction.

Steps ST24 to ST26: Thereafter, the main processor 100 carries out an interrupt processing with the designated interrupt handler to perform the arithmetic operation corresponding to the identified instruction in a manner described above for the previous case, and after writing the result of the arithmetic operation back, for example, to the data memory 500 as occasion demands, the main processor 100 causes the co-processor 200 to start operation again. The processing is then returned to the step ST19 to update the PC and SP values, whereafter the processing is returned to the above-described step ST13 to carry out the processing of the next instruction in a similar manner.

In the above-described first embodiment, the co-processor 200 itself determines whether it can process the fetched instruction by itself. When the co-processor 200 encounters an instruction which it cannot process by itself, the operation of this instruction is executed by the main processor 100 with its software while the updating process of the PC and SP values which will take place as a result of the execution of the instruction is carried out by the co-processor 200 with its hardware. Thus, the main processor 100 does not need to perform the updating process of the PC and SP values when it processes with its software the instruction which was requested to execute by the co-processor 200, so that the load on the processing by means of software in the main processor 100 can be decreased.

In this embodiment, when the co-processor 200 encounters an instruction which it cannot process by itself, it signals the main processor 100 of this fact with an interrupt vector which has been assigned exclusively to this instruction. With this arrangement, the main processor 100 can know the kind of the instruction directly from the interrupt vector. Thus, the load on the processing by means of software when specifying the interrupt handler can be decreased.

Assuming that the number of operation clocks per instruction is forty, ten or so of the forty clocks have conventionally been consumed for identifying the kind of the instruction and thus the processing necessary for identifying the kind of instruction has been a substantial load. By the provision of the above-described dedicated interrupt vectors, however, the processing for identifying the kind of instruction, such as the decoding of interpreter and the reading of the program counter performed in the interrupt processing, can be dispensed with, so that the load on the processing by the main processor is significantly reduced.

In the first embodiment described above, each of the dedicated interrupt signals S290A to S290F has been assigned in advance to a respective one of the plurality of specific instructions which the co-processor 200 cannot process by itself and which have a relatively high frequency of execution. However, the invention should not be restricted to such arrangement only, but a single dedicated interrupt request signal can be assigned to two or more instructions.

When the dedicated interrupt request signal S290A has been assigned to the "iadd" instruction and the "iaload" instruction for example, it will not be possible to identify only from this dedicated interrupt signal S290A in a univocal manner the instruction which the co-processor 200 encountered. In this case, however, the main processor 100 may carry out the processing for identifying the kind of instruction (steps ST 1 to ST34) by reading the PC value of the program counter from the co-processor 200 in a manner described above for the case where an interrupt request was made with the common interrupt request signal S290G. In this manner, by assigning a single interrupt request signal to two or more instructions, the dedicated interrupt request signals can be assigned to much more instructions although it becomes necessary to carry out the processing for identifying the instruction from the PC value.

In the above-described first embodiment, the instructions which the co-processor 200 cannot process by itself have been assumed, by way of example, to be those instructions for which data under the control of the main processor need to be handled. The present invention should not be restricted only to such arrangement. For example, when the co-processor encounters an instruction that can be executed by software more efficiently, it may request the main processor 100 to execute that instruction. Examples of such instruction may include, in addition to those instructions involving the operation of the data which is under the control of the main processor, instructions for which an exchange of stack frames (sets of stack data defined in a program) will take place and instructions each for executing a floating-point arithmetic operation.

It may also be possible to arrange such that the co-processor 200 executes those instructions which can be processed by a RISC (Reduced Instruction Set Computer) type processor employing a stack architecture while the main processor 100 executes the other instructions which need more complicated processing, to thereby separate the instructions to be processed by the main processor 100 from those to be processed by the co-processor 200.

In the first embodiment shown in FIG. 1, it may be probable that the incorporated stack memory 270 cannot secure a sufficient storage capacity on the chip of the semiconductor integrated circuit due to its limited size. In such case, it will be necessary to provide a hardware means or a software means for detecting an overflow or an underflow of the data written into the stack memory 270.

As the above hardware means, a register storing the upper-limit and the lower-limit address that the stack pointer 260A can take may be provided, for example. With such arrangement, an overflow and an underflow of the data can be detected by comparing the value of the stack pointer with the value in this register each time the value of the stack pointer is updated. Notification of the detection to the main processor 100 can be made by generating an interrupt similarly to the case where a non-executable instruction is encountered or by changing a specific bit of the control register 210.

As for the software means, for example in the Java language, the amount of data used in the stack, i.e., the size of the stack frame is specified in advance in the file, in which an intermediate code called a byte code is stored, for each unit of execution of individual programs. In such case, this can be checked by the main processor 100 according to its software before each program is executed.

When an overflow of the stack is detected, the data in the stack memory 270 is saved in the data memory 500 by the main processor 100 according to its software. On the other hand, when an underflow is detected, the data saved in the data memory 500 is restored to the stack memory 270. Such saving or restoration of data can be performed at once for the whole data of the stack memory 270 or can be performed one after the other for its divided portions.

According to this first embodiment, it can be achieved, by the integration of the high speed stack memory 270 having a limited storage capacity in the co-processor 200, that an arithmetic operation on data contained in the stack as its operand is performed by the ALU 280 at a high speed. It may also easily be possible to secure a sufficient storage capacity for avoiding an overflow from occurring by forming the data memory 500 in a semiconductor integrated circuit which is different from any of the main processor 100 and the co-processor 200.

Second Embodiment

A second embodiment of the present invention will now be described.

In the instruction system of the Java language, the top (the upper-most) four of the stack data are held in registers that are accessible at a high speed in order that instructions can be executed efficiently. Conversely speaking, those stack data other than the top four data need not be held in registers and can be held in an external memory (stack memory 270) without causing any trouble in executing an instruction. By thus allowing the stack data to be held in an external memory, the capacity of the stack data can dramatically be increased.

Described hereinafter is a microprocessor system provided in accordance with the second embodiment that is adapted to hold only the top four of the stack data as described above and yet suitable for processing the Java language.

Figure 7:
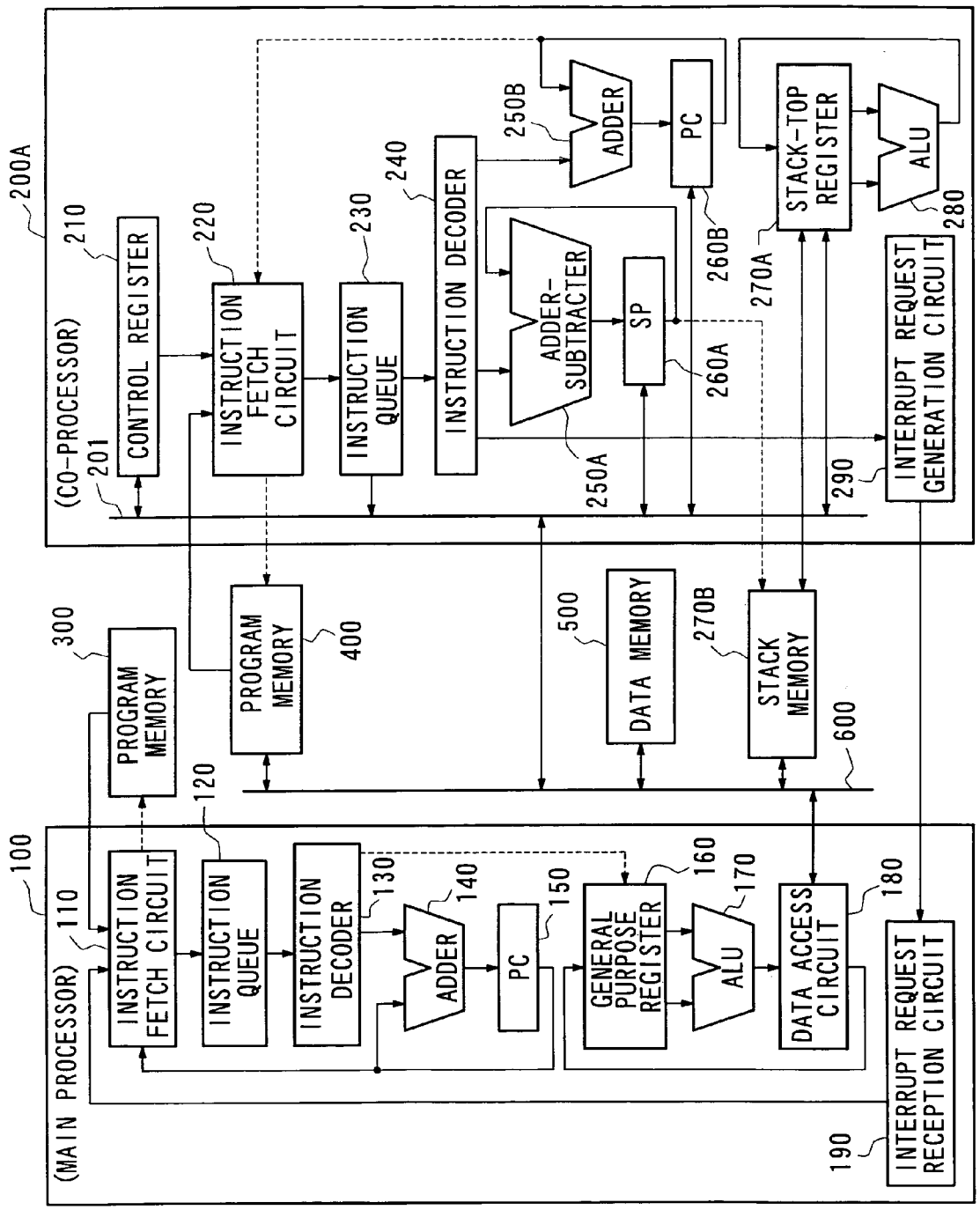
FIG. 7 is a block diagram showing the structure of a microprocessor system provided in accordance with a second embodiment of the invention.

FIG. 7 shows the structure of the microprocessor system according to this second embodiment. This microprocessor system comprises a co-processor 200A which includes, instead of the stack memory 270 provided in the above-described microprocessor system according to the first embodiment (FIG. 1), a stack-top register 270A and a stack memory 270B. In this embodiment, the instruction queue 230 is also connected to the internal bus 201 so that the main processor 100 can directly read the contents of the instruction queue 230.

The stack-top register 270A is connected to the ALU 280 and holds the top four data (a predetermined number of data, in general) among the stack data. This stack-top register 270A is constructed so that it can perform read and write operations simultaneously at a high speed. The stack memory 270B corresponds to the stack memory 270 in the above-described first embodiment and is provided outside the co-processor 200A. This stack memory 270B is connected to the external bus 600 and to the stack-top register 270A and holds the lower-order data of the stack data except for the top four data. In this arrangement, the SP value in the stack pointer 260A indicates the top address of the stack memory 270B.

Figure 8A:
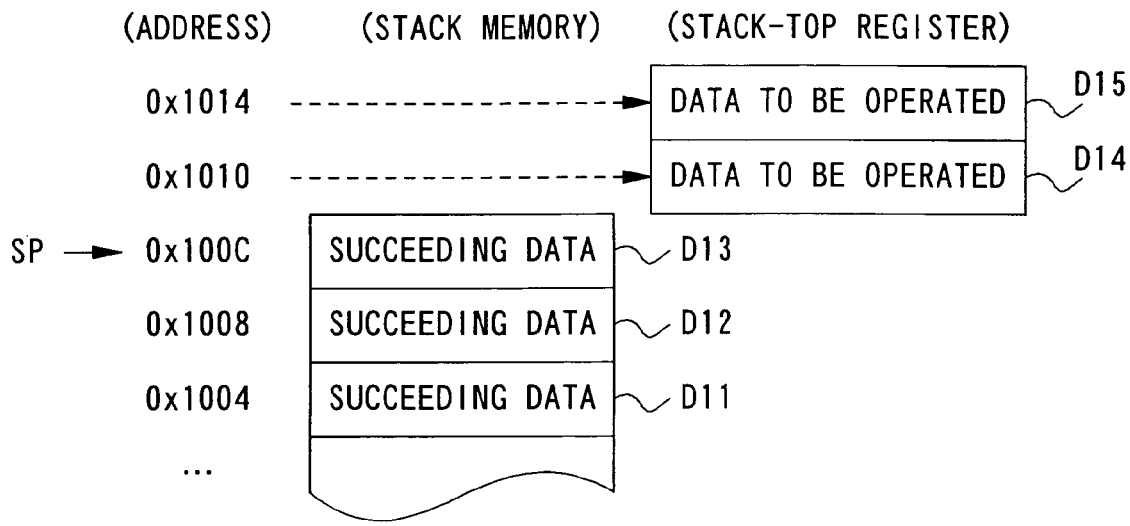
FIGS. 8A and 8B are illustrations that explain the concept of operation of the stack-top register in the second embodiment of the invention.
Figure 8B:
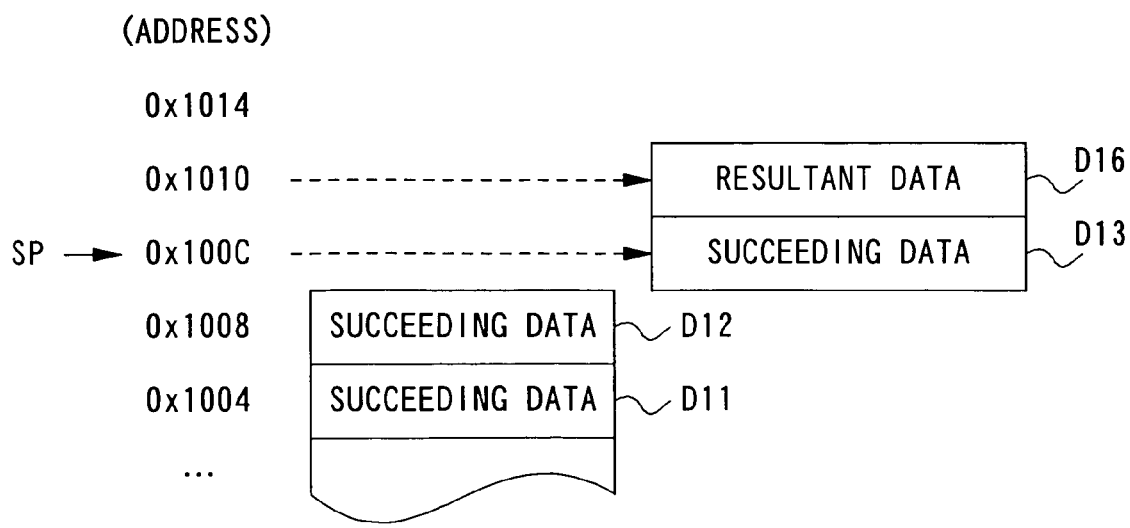

The description of the general operation of the stack-top register and the stack memory will be supplemented with reference to FIGS. 8A and 8B. For convenience sake, it is assumed that the stack-top register holds the top two data in FIGS. 8A and 8B. Each of the stack-top register and the stack memory writes and reads data in a LIFO method similarly to the above-described stack memory 270. In the example shown in FIG. 8A, the top two data D14 and D15 of the stack data D11 to D15 are held in the stack-top register.

FIGS. 8A and 8B shows, by way of example, how the contents of the stack-top register and the stack memory are changed when a binominal operation is performed. Before starting the operation, data D11 to D15 are sequentially loaded in addresses "0x1004" to "0x1014" in a stacked manner as shown in FIG. 8A. In this case, the address "0x100C" of the data D13 which was loaded last in the stack memory is the top address of the stack memory and, at the same time, corresponds to the value of the stack pointer. When a binominal operation (a binominal adding operation, for example) is started in this condition, this operation is performed on the data D14 and D15 in the stack-top register.

More specifically, if the above operation is an addition, the data D14 and the data D15 are added together, because of which the data D16 is obtained. At this moment, the data D14 and D15 will not be necessary any longer, and the addresses "0x010" and "0x1014" become empty. Therefore, the data D16 thus obtained as the operation result is stored in the lower-order one of the emptied addresses, i.e., the address "0x0100" which is next to the succeeding data D13. In this case, the two data, namely, the top data D16 and its succeeding data D13, are held in the stack-top register. In this manner, during the process of an operation a predetermined number of data of the stack data are temporarily retained in the stack-top register.

Although the supplementary description was just made above such that the top two data are held in the stack-top register, the top four data are held in the stack-top register 270A according to the structure of the second embodiment (FIG. 7). Of course, the present invention should not be restricted to such number, but the number of data held in the stack-top register 270A may be set to any number as occasion demands.

The operation of this second embodiment including the operation for exchanging stack frames (sets of stack data as defined in a program) will now described with reference to the flow chart shown in FIG. 9.

First, the operation of various portions is initialized by resetting this microprocessor system. After this resetting, the main processor 100 starts its operation while the co-processor 200A is held in a stop state.

Step ST101: In this condition, the main processor 100 sets by its operation according to software the top address of the stack to the stack pointer 260A in the co-processor 200A and sets the top address of a program to be executed by the co-processor 200A to the program counter 260B. In this manner, the initial values are set to the stack pointer 260A and the program counter 260B of the co-processor 200A.

Step ST102: Subsequently, the main processor 100 sets, by its operation according to software, control data for commanding a "start of operation" (data "0", for example) to the control register 210 in the co-processor 200A to thereby cause the co-processor 200A to start operation.

Step ST103: The co-processor 200A, which has thus started its operation, then refers to the address set to the program counter 260B to access the program memory 400 in which intermediate codes of the second instruction set are laid, by its operation according to hardware, to thereby autonomously fetch a second instruction from this address. The fetched instruction is held in the instruction queue 230 and decoded by the instruction decoder 240 in the co-processor 200A.

Step ST104: Subsequently, the co-processor 200A determines whether the fetched instruction is such an instruction that the stack frame is changed.

Figure 10:
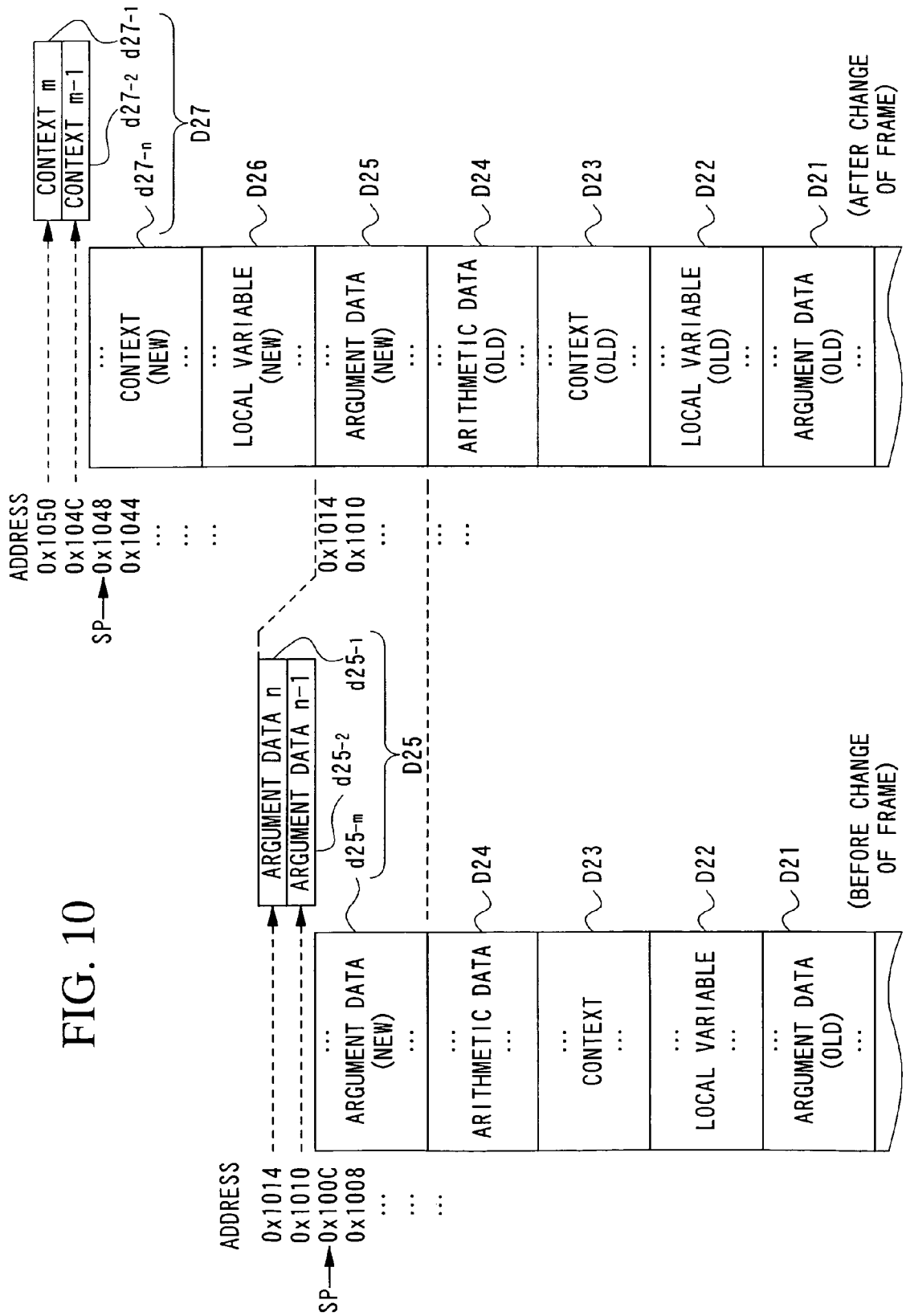
FIG. 10 is an illustration that explains the concept of operation of the stack-top register in the second embodiment of the invention when the stack frame is changed.

The concept of changing the stack frame is further described with reference to FIG. 10 for the exemplary case where the stack-top register retains two data from the top. In this example, argument data D21, local variable D22, context D23, arithmetic data D24 and a part of argument data D25 (argument data d25-*m*) have been stored in the stack memory 270B before changing the stack frame. On the other hand, the remaining parts of the argument data D25 (argument data d25-1 and d25-2) have been stored in the stack-top register 270A. These top data D21 to D25 forms one stack frame.

When a change of frame is performed, a new set of data is placed on the frame before the change, and the set of data on the topside forms a new stack frame. In the example shown in FIG. 10, local variable D26 and context D27 are held in such a manner that they are placed on the data D25 which was the stack top up to that time, with the result that a new stack frame is formed by the argument data D25 to the context D27 on the top side.

After the change of frame, the stack memory 270B now stores, in addition to the argument data D21 to the argument data D25, the local variable D26 and a part of the context D27 (context d27-*n*) as new data. On the other hand, the stack-top register 270A stores the remaining parts of the context D27 (context d27-1 and d27-2). The sequence of processing steps for changing the stack frame is carried out by the main processor 100 according to its software.

As described above, the value of the stack pointer significantly changes when a change of stack frame is performed. When such processing is carried out, since the stack data should be manipulated over the stack top-register 270A and the stack memory 270B, the processing to be carried out in the main processor 100 becomes substantially complex.

In view of this, before the processing for changing the stack frame is carried out, all the contents of the stack-top register 270A is moved in advance to the stack memory 270B. According to this arrangement, it is now only necessary to refer to the stack memory 270B in the processing for changing the stack frame, so that the load on this processing is substantially reduced.

Figure 9:
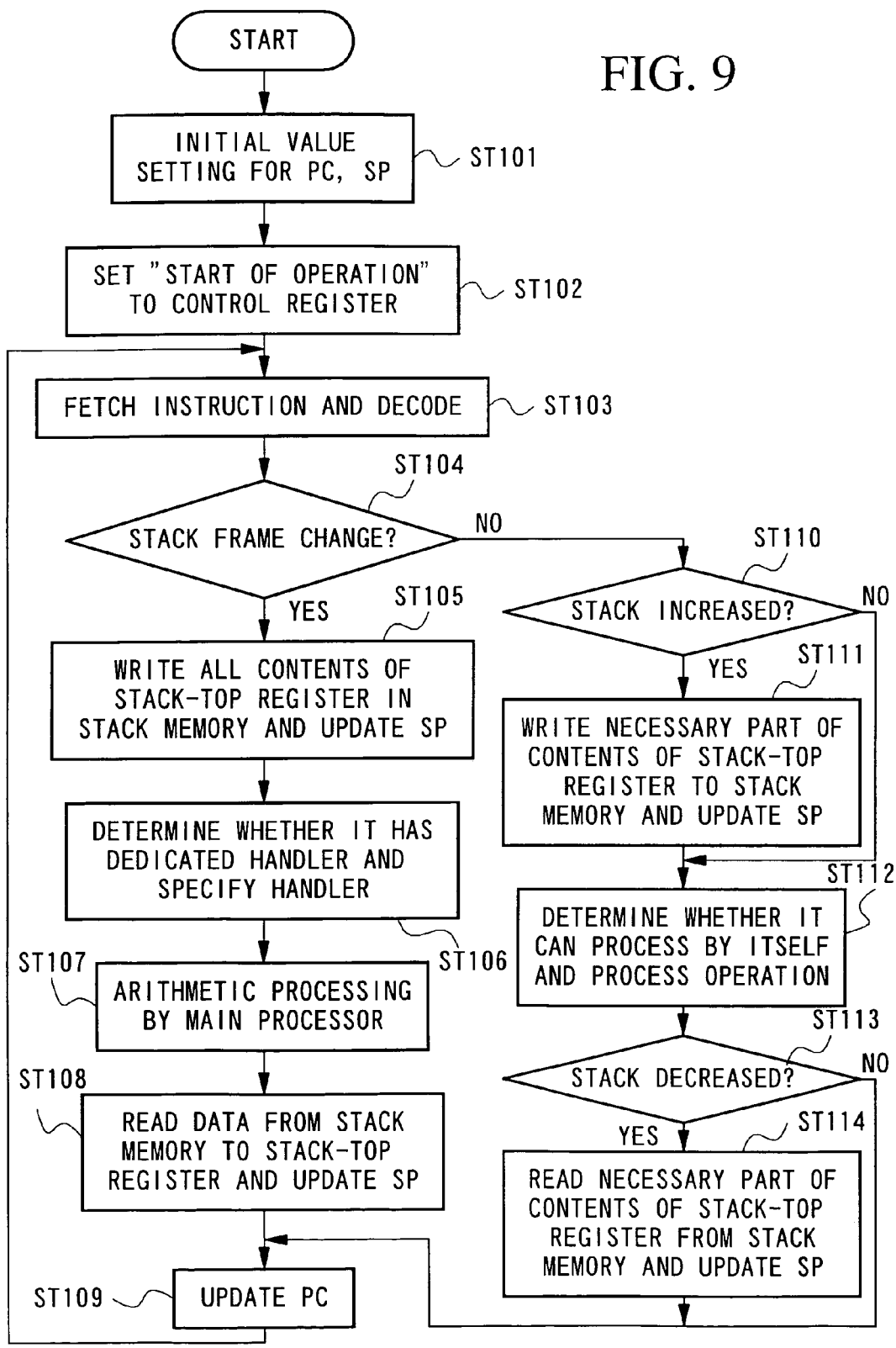
FIG. 9 is a flow chart showing the operation of the microprocessor system according to the second embodiment of the invention.

Description will now be returned to the flowchart shown in FIG. 9.

Step ST105: When it is determined in the above-described step ST104 that the fetched instruction is an instruction which changes the stack frame ("YES" at step ST104), the co-processor 200A writes all the contents of the stack top register 270A into the stack memory 270B. The co-processor 200A then updates the SP value of the stack pointer 260A in accordance with the increase in data of the stack memory 270A because of this writing.

Step ST106: Subsequently, the co-processor 200A determines whether the fetched instruction has its own dedicated interrupt handler and generates an interrupt request accordingly. Consequently, an interrupt handler is specified by the main processor 100. The processing in the step ST106 is carried out in a manner described above for the processing in the steps ST20 to ST23 and ST30 to ST34 (see FIG. 6) in the first embodiment.

Step ST107: The processing for changing the stack frame is then carried out. More specifically, the main processor 100 reads data necessary for this processing from the stack memory 270B, in which all the stack data has been stored, or from the data memory 500, to thereby prepare a new stack frame. Then, the main processor reads the SP value of the stack pointer 260A (an address) and the PC value of the program counter 260B (an address) in the co-processor 200A and save them. Subsequently, the main processor writes new values (addresses) into the stack pointer 260A and the program counter 260B. Then, the main processor writes the operation results back to the stack memory 270B or the data memory 500. The main processor then sets control data for commanding a "start of operation" to the control register 210 in the co-processor 200A to thereby cause the co-processor 200A to start operation.

Step ST108: The co-processor 200A, which has thus restarted its operation, reads data corresponding in number to the data in the stack-top register 270A from the stack memory 270B containing the operation results of the main processor 100, and writes these data into the stack-top register 270A to hold them. The co-processor then updates the SP value of the stack pointer 260A in accordance with the decrease in data of the stack memory 270B because of the above reading.

Step ST109: After that, the co-processor 200A updates the program counter 260B by adding "0" to the PC value and returns the processing to the above-described step ST103 for processing the next instruction.

Step ST110: When it is determined in step ST104 that it is not an instruction which changes the stack frame ("NO" at step ST104), the co-processor 200A determines whether the fetched instruction is an instruction which increases the stack or not. The reason for this is that if data to be stacked in the stack memory 270B is generated as a result of the execution of the fetched instruction, a space must be reserved in the stack memory 270B.

In other words, the determination in this step is made for determining whether such a space must be reserved prior to the execution of the operation. In the case where the stack decreases, it will not be allowed to decrease the stack pointer before the execution of the operation. This is because if the stack pointer is decreased it may happen that data necessary for the operation could be invalidated.

Step STI11: In the case of an instruction which increases the stack ("YES" at step ST110), the co-processor 200A writes the required part of the contents of the stack-top register 270A into the stack memory 270B and updates the value of the stack pointer 260A accordingly. On the other hand, in the case of an instruction which does not increase the stack ("NO" at step ST110), the step ST111 is skipped.

Step ST112: Subsequently, the co-processor 200A determines whether it can process the fetched instruction by itself, and the processing by the co-processor 200A according to its hardware or the processing by the main processor 100 according to its software is performed in accordance with the results of the above determination, the processing of this instruction being thus performed in an adaptive manner. The more specific processing in this step ST112 is the same as that performed in the steps ST15 to ST18, ST20 to ST26 and ST30 to ST34 in the above-described first embodiment (see FIGS. 5 and 6). In the case of this second embodiment, since the main processor 100 can directly access the instruction queue 230 in the co-processor 200A, when the main processor 100 processes an instruction requested by the co-processor 200A, it can identify the kind of the instruction to be processed by referring to the instruction queue 230 of the co-processor 200A to thereby specify an instruction handler corresponding to that instruction. In this manner, the kind of instruction can quickly be identified even when it is an instruction to which no dedicated interrupt vector has been assigned.

Step ST113: The co-processor 200A then determines whether the fetched instruction is an instruction that decreases the stack.

Step ST114: In the case of an instruction which decreases the stack ("YES" at step ST113), the co-processor 200A reads as much data as necessary for the stack-top register from the stack memory and updates the value of the stack pointer 260A. In contrast, in the case of an instruction that does not decrease the stack ("NO" at step ST113), this step ST114 is skipped.

Thereafter, the processing proceeds to the step ST109, in which the PC value of the program counter 260B is updated. Then, the processing returns to the step ST103 to process the next instruction.

In this second embodiment, as described above, in the case where the instruction decoded by the instruction decoder 240 changes the stack pointer to a non-continuous area (for example, in the case where the stack frame is changed as described above), the co-processor 200A writes all the stack data of the stack-top register 270A into the stack memory 270B before notifying the main processor 100 and reads the top data from the stack memory 270B into the stack-top register 270A after the processing by the main processor 100 is complete and the operation of the co-processor resumes.

Thus, the main processor 100 can handle the stack data in the interrupt handler in a single memory space, so that the processing for handling the data in the stack-top register 270A is simplified. As a result, instructions of those program languages such as the Java language that have affinity to the architecture including the stack-top register 270A can be executed efficiently.

According to this second embodiment, the storage capacity of the stack memory 270B can also be increased since the stack memory 270B is provided outside the co-processor 200A. Nevertheless, the stack memory 270B may be provided inside the co-processor 200A if it is feasible.

Third Embodiment

A third embodiment of the present invention will now be described.

Figure 11:
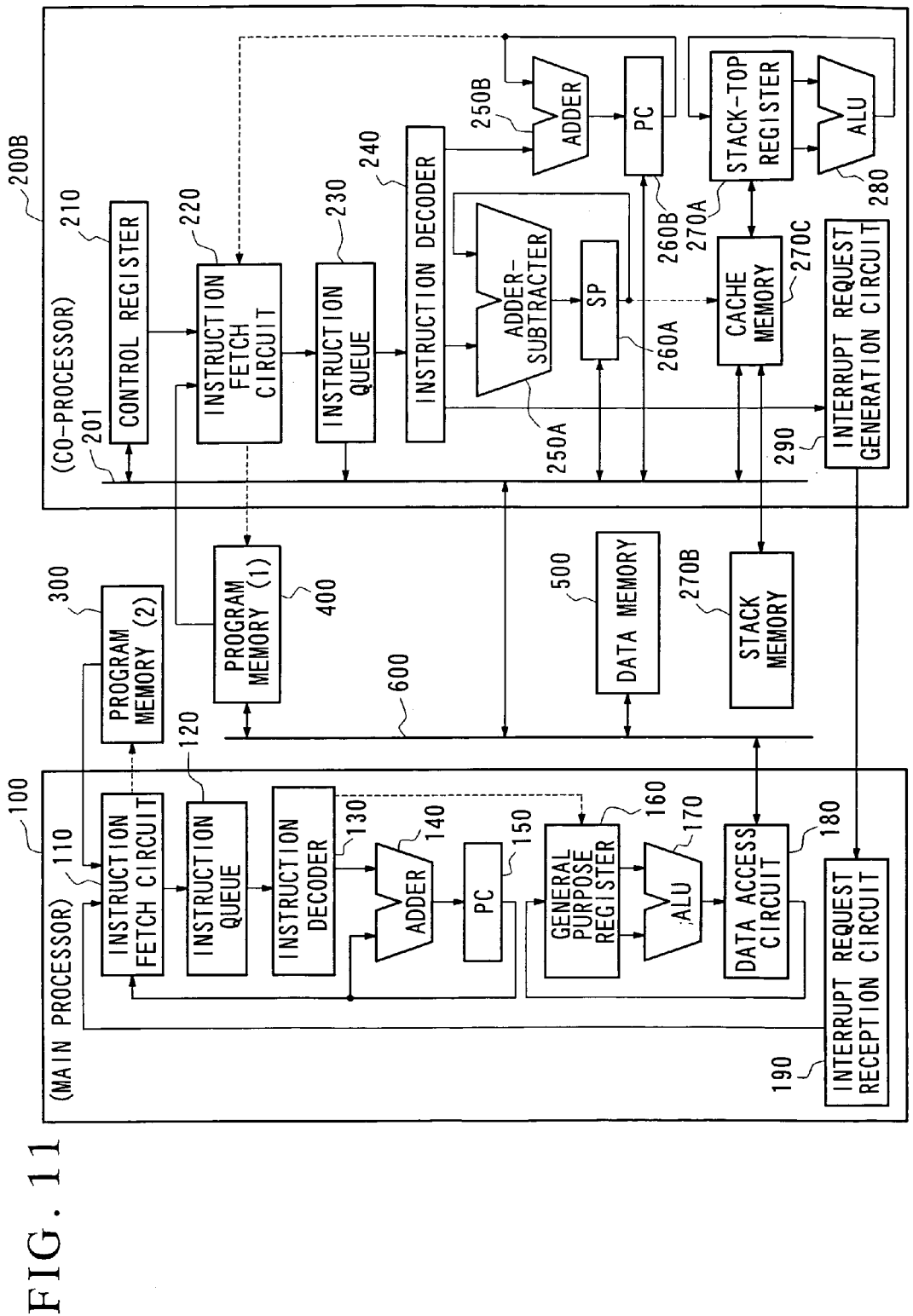
FIG. 11 is a block diagram showing the structure of a microprocessor system provided in accordance with a third embodiment of the invention.

FIG. 11 shows the structure of a microprocessor system provided in accordance with this third embodiment. This microprocessor system is different from the above-described second embodiment (FIG. 7) in that it comprises a co-processor 200B which includes a cache memory 270C between the stack-top register 270A and the stack memory 270B. This cache memory 270C is provided for caching a part of the data retained in the stack memory 270B.

In this third embodiment, the stack memory 270B is separated from the external bus 600.

By the provision of the cache memory 270C, it is apparently achieved that the external stack memory 270B is accessed at a high speed, with the result that the processing is accelerated. In this case, the stack memory 270B must be accessed through the cache memory 270C in order to maintain the concordance of data between the stack memory 270B and the cache memory 270C. For that purpose, the stack memory 270B is separated from the external bus 600 so that the stack memory 270B cannot directly be accessed by the external bus 600.

More specifically, in order to access data contained in the stack memory 270B the main processor 100 must gain such an access through the external bus 600 and the internal bus 201 of the co-processor 200B and further through the cache memory 270C.

With this third embodiment, a high-speed access to the stack memory 270B can be achieved since the stack memory 270B is accessed through the cache memory 270C. That is to say, even if the stack memory 270B is of the type that a high speed accessing is impossible, the apparent processing therefor can be accelerated.

With this third embodiment, the storage capacity of the stack memory 270B can be increased since the stack memory 270B is located externally of the co-processor 200B.

Furthermore, with this third embodiment it will not be necessary to take any measure against an overflow if the storage capacity of the externally connected stack memory 270B is made a large, since the cache memory 270C itself has a function of controlling data to be cached. That is to say, although an overflow or an underflow is detected in the first embodiment by hardware or a software means, this third embodiment does not need an overflow detection means or an underflow detection means. In addition, since no exchange of memory will be needed when an overflow or an underflow is detected, the chip size as well as the size of program code for the control software can be decreased.

Fourth Embodiment

A fourth embodiment of the present invention will now be described.

Figure 12:
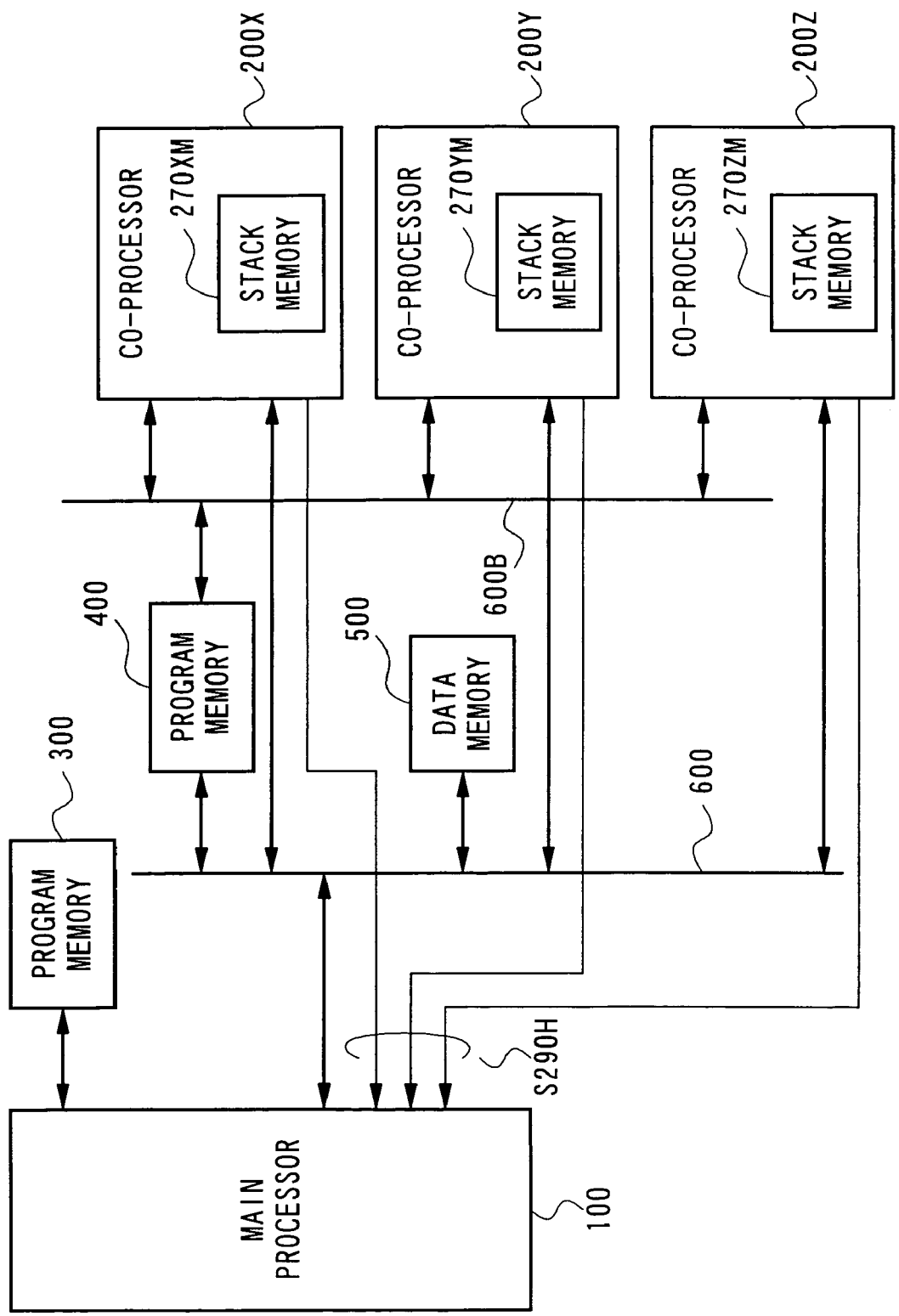
FIG. 12 is a block diagram showing the structure of a microprocessor system provided in accordance with a fourth embodiment of the invention.

FIG. 12 shows the structure of a microprocessor system provided in accordance with this fourth embodiment. This processor system comprises a plurality of co-processors (three co-processors in this case) 200X, 200Y and 200Z with respect to the single main processor 100. The co-processors 200X, 200Y, and 200Z comprise dedicated stack memories 270XM, 270YM and 270ZM, respectively, each of which corresponds to the stack memory 270 of the above described first embodiment.

The co-processors 200X, 200Y, and 200Z are connected to the main processor 100 through the external bus 600 and to the program memory 400 through an external bus 600B. The program memory 400 and the data memory 500 are connected to the main processor 100 through the external bus 600. Interrupt requests S290H from the respective co-processors are directly inputted to the main processor 100.

In this fourth embodiment, stored in each of the stack memories 270XM, 270YM and 270ZM of the co-processors is local data (for example, local variable, local arithmetic data and local working data) specific to a respective one of the co-processors. In the case of the Java language, for example, a set of data corresponding to a "thread" which is a unit of task described in a program is stored as the local data.

In this fourth embodiment, the determination of whether a given instruction is an instruction to be processed by the main processor 100 or an instruction to be processed by any of the co-processors 200X, 200Y and 200Z is made based on whether a heap area (i.e., an area in which an object is written) provided in the data memory 500 has to be manipulated or not. That is to say, an instruction that needs manipulation of the heap area is processed by the main processor 100, while an instruction that needs no manipulation of the heap area is processed by the co-processor 200X, 200Y, and 200Z.

When threads, which two or more of the co-processors execute, access an object formed in a heap area in the data memory 500, the main processor 100 carries out an exclusive control among the respective threads.

More specifically, each of the co-processors processes only those instructions that it can execute by itself by accessing a respective one of the stack memories 270XM, 270YM and 270ZM in which specific local data are contained. In contrast, the main processor 100 processes those instructions that involve coordination among the co-processors. For example, an "invokevirtual" instruction as defined in the Java virtual machine selectively executes a specific process in a program in which a plurality of processes are described with respect to an object in a heap area. In this case, when the object to be processed is being used exclusively by another thread, the execution of the program must be waited for until the use is terminated. The main processor 100 waits for the end of the thread under execution and then accesses the co-processor, from which the next request was received, to set the address in which the process to be executed is described to the program counter and thereafter sets the control register of the relevant co-processor to the "start of operation" state.

However, a "Garbage Collection" instruction of the Java language, i.e., a process for operating an object in a heap area to remove data which is not necessary any longer, is executed by the main processor 100 irrespective of any interrupt from the co-processors.

In order to prevent interrupts from the co-processors from being received during the processing of the "Garbage Collection"; the main processor 100 is arranged to mask these interrupts in advance. With this arrangement, it can be avoided that an object whose storage location has been moved due to the "Garbage Collection" is rewritten.

According to this fourth embodiment, a multiple of tasks can be processed by the plurality of co-processors 200X, 200Y and 200Z, so that those programs such as the Java language which have the concept of multi-thread can be executed at a high speed.

In addition, the processing time of the microprocessor system as a whole can significantly be reduced since the main processor 100 can carry out processes such as the "Garbage Collection" in parallel with the processing in each of the co-processors.

Furthermore, the main processor 100 can easily control the requests for operating objects by masking interrupts from the respective co-processors. Thus, a "Garbage Collection" can be performed easily and in real time.

When accesses to an object formed in a heap area in the data memory 500 occur in threads executed by two or more of the co-processors, an exclusive control among the threads is performed collectively by the main processor 100. Therefore, it will not be necessary to provide any means or program for such exclusive control in the co-processors, and the program provided in the main processor 100 for the exclusive control can be simplified.

Although the invention has been described above only with reference to the first to fourth embodiments, the present invention should not be restricted only to these embodiments, but any modification thereof made without departing from the spirit of the invention should be construed to fall within the scope of the present invention.

In the above-described embodiments, various notifications to the main processor are made by means of interrupts from the co-processor to the main processor. However, the present invention should not be restricted to such a structure only, but the main processor may recognize the fact that the co-processor encounters a specific instruction which it cannot execute by itself, by providing in the co-processor a status register in which data for notifying an interrupt request is written and by periodically accessing this status register by the main processor (i.e., by a so-called polling). With this arrangement, the "notification" is eventually transmitted to the main processor that executes the corresponding process in response thereto.

The present invention can be regarded as an invention in which the manner of processing an instruction that the co-processor encounters is selected in accordance with the contents of that instruction, when viewed from another angle. For example, the subject which carries out the processing is selected in such a manner that those instructions which can be processed only with the stack data which the co-processor has are processed by the co-processor itself, while those instructions which needs a manipulation of a heap area in the data memory as well as those instructions which needs a modification of the stack frame are processed by the main processor.

What is claimed is:

1. A microprocessor system for executing instructions described in a program, said system comprising:
   a main processor executing, by hardware, instructions which belong to a first instruction set and executing, by software, instructions which belong to a second instruction set, said main processor including an interrupt request reception circuit to encode an interrupt vector for said execution of an instruction of said second instruction set by using an interrupt handler, said interrupt request reception circuit generating an interrupt vector address corresponding to said interrupt vector; and
   a co-processor operative under the control of said main processor autonomously fetching an instruction belonging to said second instruction set to execute same by hardware of said co-processor, said co-processor including an interrupt request generation circuit for decoding an interrupt request signal, said interrupt request generation circuit being connected to said interrupt request reception circuit by at least one signal line and said decoding allowing said interrupt vector address to be identified in said main processor.

2. A microprocessor system according to claim 1, wherein said co-processor detects an encounter with a specific one of the instructions belonging to said second instruction set which said co-processor cannot process by itself and issues a notification of said encounter to said main processor to thereby request the main processor to execute said specific instruction.

3. A microprocessor system according to claim 2, wherein said co-processor detects an encounter with a specific one of the instructions belonging to said second instruction set for which data presently under the control of said main processor needs to be handled to thereby determine that said co-processor has encountered a specific instruction which cannot be processed by itself.

4. A microprocessor system according to claim 2, wherein said co-processor issues said notification by dedicated interrupt vectors assigned in advance, respectively, to a predetermined number of the instructions belonging to said second instruction set which have a higher frequency of execution than the other instructions.

5. A microprocessor system according to claim 4, wherein at least one of said dedicated interrupt vectors is assigned to a plurality of instructions belonging to said second instruction set.

6. A microprocessor system according to claim 4, wherein priorities are set to a plurality of said dedicated interrupt vectors.

7. A microprocessor system according to claim 6, wherein a single instruction is assigned to a given one of said dedicated interrupt vectors to which a higher priority is set, while a plurality of instructions are assigned to a given one of said dedicated interrupt vectors to which a lower priority is set.

8. A microprocessor system according to claim 4, wherein said interrupt request reception circuit in said main processor encodes said dedicated interrupt vectors sent from said co-processor to specify an interrupt handler which corresponds to said specific instruction to be processed.

9. A microprocessor system according to claim 2, wherein said co-processor further comprises:
   a program counter for holding an address of an instruction which is currently processed and belongs to said second instruction set; and
   a hardware resource for carrying out a process for updating said program counter among processes which take place in the course of execution of said specific instruction.

10. A microprocessor system according to claim 2, wherein said co-processor further comprises:
    a status register for holding information indicative of a need of said notification, and wherein said main processor periodically accesses said status register to recognize, from a content of said status register, that said co-processor has encountered said specific instruction to thereby execute said specific instruction.

11. A microprocessor system according to claim 2, wherein said co-processor further comprises an instruction queue for holding a fetched instruction which belongs to said second instruction set and wherein said main processor refers to said instruction queue of said co-processor to specify an interrupt handler which corresponds to said specific instruction to be executed.

12. A microprocessor system according to claim 1, wherein said co-processor further comprises:
    a stack memory for holding data generated in the course of execution of an instruction which belongs to said second instruction set;
    a stack pointer for holding an address of the most recent data in said stack memory; and
    a hardware resource for carrying out a process for updating said stack pointer among processes which take place in the course of execution of said specific instruction.

13. A microprocessor system according to claim 1, wherein said co-processor includes a stack architecture.

14. A microprocessor system according to claim 13, further comprising:
    a stack memory provided outside said co-processor,
    wherein said co-processor further comprises:
    a stack-top register for holding a predetermined number of top data of stack data.

15. A microprocessor system according to claim 14, wherein said co-processor further comprises:
a cache memory provided between said stack memory and said stack-top register for caching a part of data held in said stack memory.

16. A microprocessor system according to claim 14, wherein said co-processor detects a predetermined instruction for which said stack data needs to be manipulated over said stack-top register and said stack memory, whereupon said co-processor moves contents of said stack-top register to said stack memory and thereafter requests said main processor to execute said predetermined instruction, said main processor referring to contents of said stack memory, to which said contents of said stack-top register have been moved, to thereby execute said predetermined instruction.

17. A microprocessor system according to claim 1, further comprising:
a plurality of co-processors in correspondence with a plurality of processes described in a program.

18. A microprocessor system according to claim 1, further comprising:
a program memory in which instructions belonging to said second instruction set are contained, wherein said co-processor further comprises:
a program counter for holding an address of an instruction that is currently processed and belongs to said second instruction set;
an instruction queue for holding instructions which belong to said second instruction set; and
an instruction fetch circuit for fetching an instruction belonging to said second instruction set from said program memory using a value contained in said program counter as its address and for setting the fetched instruction to said instruction queue.

19. A method of processing computer programs, said method comprising:
using a main processor executing hardware instructions which belong to a first instruction set and executing software instructions which belong to a second instruction set;
using a co-processor, operative under the control of said main processor, for autonomously fetching instructions belonging to said second instruction set to execute the fetched instructions by hardware of said co-processor, wherein said co-processor is unable to execute at least one instruction in said second instruction set; and
generating an interrupt request from said co-processor to said main processor when said co-processor detects encountering said at least one instruction belonging to said second instruction set which said co-processor cannot execute by itself, thereby requesting that said main processor execute said instruction,
wherein said interrupt request comprises a signal on at least one signal line between said main processor and said co-processor dedicated to an interrupt vector signal, said interrupt vector comprising a dedicated interrupt vector component and a common interrupt request component, said dedicated interrupt vector component comprising a decoding for a specific interrupt handler to be executed by said main processor and said common interrupt request component providing an indication for a request for one of a plurality of other interrupt handlers to be specifically identified by additional information.

20. The method of claim 19, further comprising:
converting said decoded signal into an interrupt handler address in said main processor.

21. The method of claim 19, wherein said at least one signal line comprises a plurality of signal lines.

22. A microprocessor system, comprising:
a main processor including an interrupt request reception circuit to encode an interrupt vector, said interrupt vector comprising a dedicated interrupt vector component and a common interrupt request component, said interrupt request reception circuit generating an interrupt vector address corresponding to said interrupt vector;
a co-processor operative under the control of said main processor autonomously fetching and executing an instruction, said co-processor including an interrupt request generation circuit for decoding an interrupt request signal; and
at least one signal line interconnecting said interrupt request generation circuit and said interrupt request reception circuit,
wherein said dedicated interrupt vector component comprises a decoding for a specific interrupt handler to be executed by said main processor and said common interrupt request component provides an indication for a request for one of a plurality of interrupt handlers to be specifically identified by additional information.

23. The microprocessor system of claim 22, wherein said at least one signal line comprises a plurality of signal lines.

24. A microprocessor system for executing instructions described in a program, comprising:
a main processor for executing by hardware those instructions which belong to a first instruction set and for executing by software those instructions which belong to a second instruction set; and
a co-processor operative under a control of said main processor for autonomously fetching an instruction belonging to said second instruction set to execute the fetched instruction by hardware of the co-processor,
wherein said coprocessor is provided with:
a stack memory for holding data generated in a course of execution of an instruction which belongs to said second instruction set;
a stack pointer for holding an address of most recent data in said stack memory;
a program counter for holding an address of an instruction which is currently processed and belongs to said second instruction set; and
an updating circuit for, in response to a detection of an encounter with a specific instruction among instructions belonging to said second instruction set for which data presently under the control of said main processor needs to be handled, issuing a notification of said encounter to said main processor to request the main processor to execute said specific instruction, and for updating said stack pointer for said stack memory in said coprocessor and said program counter in said coprocessor during an execution by said main processor.

25. A microprocessor system according to claim 24, wherein said co-processor issues said notification by dedicated interrupt vectors assigned in advance respectively to a predetermined number of instructions among the instructions belonging to said second instruction set which have a higher frequency of execution than the other instructions.

26. A microprocessor system according to claim 25, wherein said main processor comprises an interrupt request reception circuit for encoding said dedicated interrupt vectors sent from said co-processor to specify an interrupt handler which corresponds to said specific instruction to be processed.

27. A microprocessor system according to claim 25, wherein said co-processor includes a stack architecture.

28. A microprocessor system according to claim 27, wherein said co-processor comprises:
   a stack-top register for holding a predetermined number of top data of stack data; and
   a cache memory provided between said stack memory provided outside said co-processor and said stack-top register for caching a part of data held in said stack memory.

29. A microprocessor system according to claim 25, further comprising a plurality of co-processors corresponding to a plurality of processes described in said program.

30. A microprocessor system according to claim 24, wherein said co-processor comprises a status register for holding information indicative of a need of said notification, and
   wherein said main processor periodically accesses said status register to recognize that said co-processor has encountered said specific instruction based on said status register, to thereby execute said specific instruction.

31. A microprocessor system according to claim 30, further comprising a plurality of co-processors corresponding to a plurality of processes described in said program.

32. A microprocessor system according to claim 24, wherein said main processor refers to an instruction queue of said co-processor to specify an interrupt handler which corresponds to said specific instruction to be executed.

33. A microprocessor system according to claim 24, wherein said co-processor includes a stack architecture.

34. A microprocessor system according to claim 29, wherein said co-processor comprises:
   a stack-top register for holding a predetermined number of top data of stack data; and
   a cache memory provided between said stack memory provided outside said co-processor and said stack-top register for caching a part of data held in said stack memory.

35. A microprocessor system according to claim 24, further comprising a plurality of co-processors corresponding to a plurality of processes described in said program.

* * * * *